(12) United States Patent
Aida

(10) Patent No.: US 12,730,320 B2
(45) Date of Patent: Sep. 8, 2026

(54) IMAGE DISPLAY APPARATUS AND IMAGE DISPLAY SYSTEM

(71) Applicant: CANON KABUSHIKI KAISHA, Tokyo (JP)

(72) Inventor: Tomohisa Aida, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 263 days.

(21) Appl. No.: 18/732,868

(22) Filed: Jun. 4, 2024

(65) Prior Publication Data

US 2024/0411139 A1 Dec. 12, 2024

(30) Foreign Application Priority Data

Jun. 12, 2023 (JP) ................................ 2023-096488

(51) Int. Cl.
*G02B 27/01* (2006.01)
*G02B 6/34* (2006.01)
*G02B 25/00* (2006.01)

(52) U.S. Cl.
CPC ........... *G02B 27/0172* (2013.01); *G02B 6/34* (2013.01); *G02B 25/001* (2013.01); *G02B 2027/0178* (2013.01)

(58) Field of Classification Search
CPC .... G02B 27/0172; G02B 6/34; G02B 25/001; G02B 2027/0178
USPC .......................................... 359/630; 345/7–9
See application file for complete search history.

(56) References Cited

U.S. PATENT DOCUMENTS

| | | | | |
|---|---|---|---|---|
| 11,561,461 | B2 | 1/2023 | Aida | |
| 2017/0276947 | A1 * | 9/2017 | Yokoyama | G02B 6/0016 |
| 2020/0341194 | A1 | 10/2020 | Waldern | |
| 2024/0094540 | A1 | 3/2024 | Aida | |

* cited by examiner

*Primary Examiner* — William Choi
(74) *Attorney, Agent, or Firm* — Carter, DeLuca & Farrell LLP

(57) ABSTRACT

An image display apparatus includes a light source unit, an image generating element configured to modulate an incident light beam and to generate an image light beam, a light guide member configured to propagate a light beam from the light source unit inside the light guide member and to emit as an illumination light beam part of the light beam from each of a plurality of regions on the light guide member toward the image generating element, an optical system configured to guide the image light beam from the image generating element to an observation side or a projection side, and a light-distribution-angle conversion element disposed between the light guide member and the optical system and configured to convert a light distribution angle of the image light beam. Predetermined inequalities are satisfied.

15 Claims, 19 Drawing Sheets

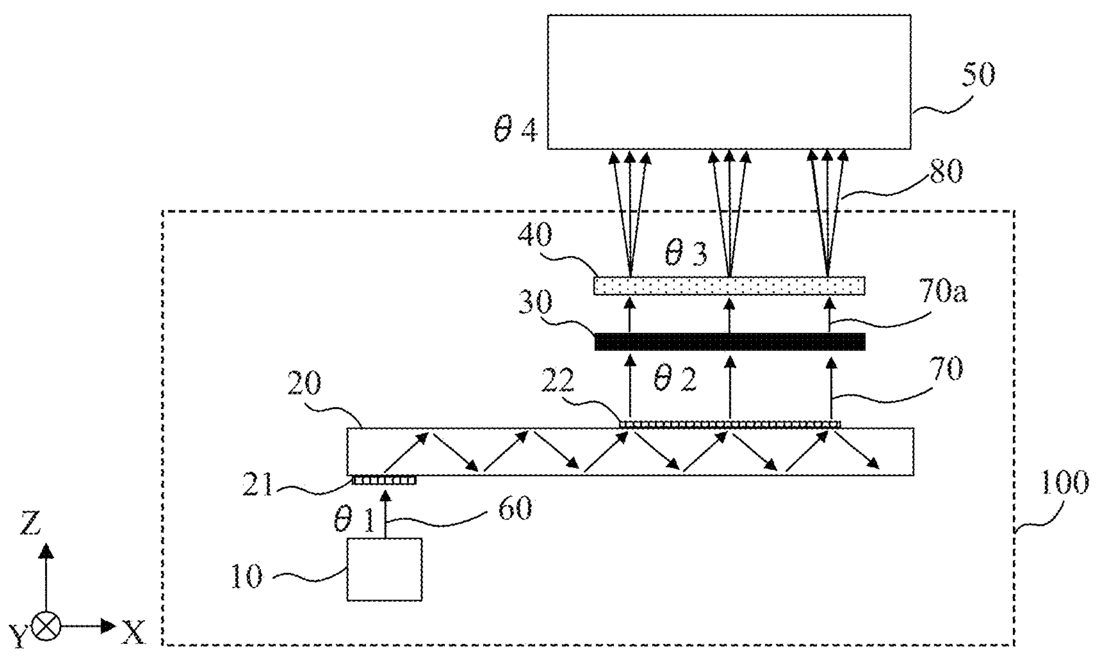
FIG. 1
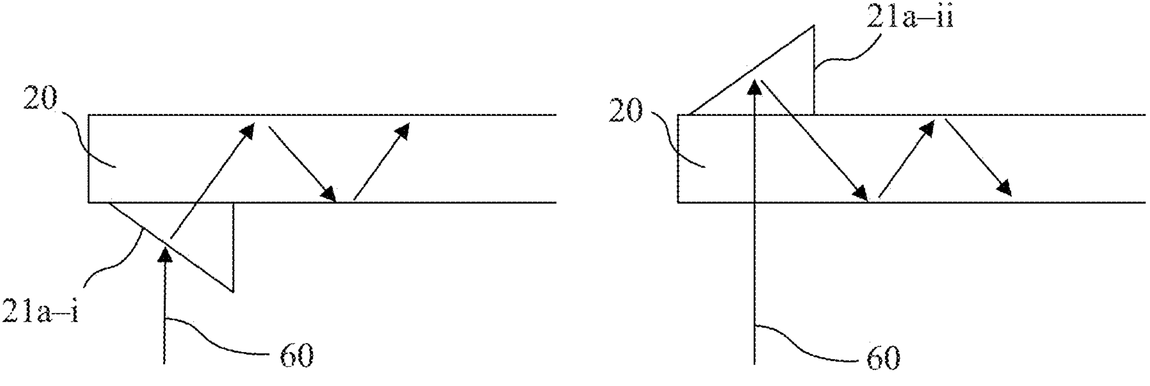
FIG. 2A
FIG. 2B

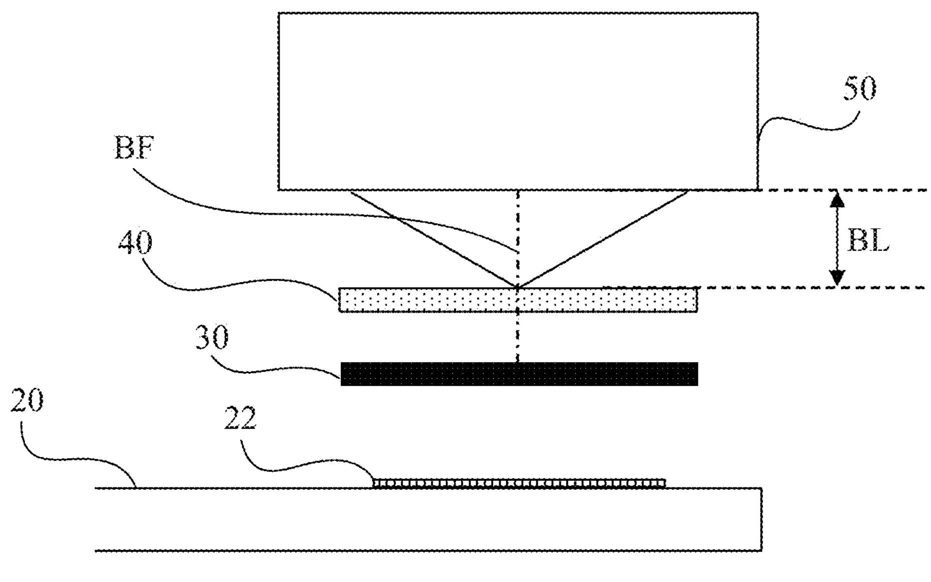
FIG. 12
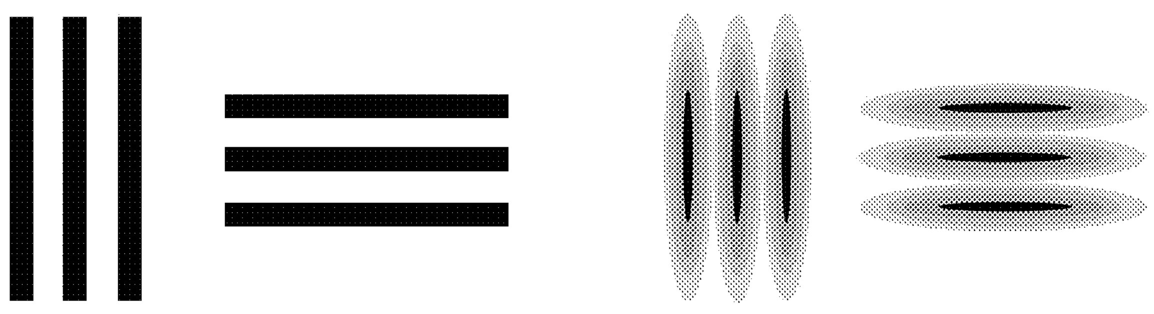
FIG. 13A
FIG. 13B

IMAGE DISPLAY APPARATUS AND IMAGE DISPLAY SYSTEM

BACKGROUND

Technical Field

One of the aspects of the embodiments relates to an image display apparatus, such as a head mount display (HMD) and smart glasses.

Description of Related Art

US Patent Application Publication No. 2020/0341194 discloses an image display apparatus that introduces light from a light source to an image generating element via a light guide member as a backlight with a wide light distribution characteristic, and guides exit light from the image generating element to the observer's (viewer's) eye or projection surface via an optical system.

In the image display apparatus disclosed in US Patent Application Publication No. 2020/0341194 includes an element (diffusion plate) configured to control a light distribution angle and disposed between the image generating element and the optical system. As a result, the resolution of an image formed by the light emitted from the optical system is lowered. Furthermore, since the element for controlling the light distribution angle is provided within the light guide member, the configuration becomes complicated.

SUMMARY

An image display apparatus according to one aspect of the disclosure includes a light source unit, an image generating element configured to modulate an incident light beam and to generate an image light beam, a light guide member configured to propagate a light beam from the light source unit inside the light guide member and to emit as an illumination light beam part of the light beam from each of a plurality of regions on the light guide member toward the image generating element, an optical system configured to guide the image light beam from the image generating element to an observation side or a projection side, and a light-distribution-angle conversion element disposed between the light guide member and the optical system and configured to convert a light distribution angle of the image light beam or configured to convert a light distribution angle of at least one of the illumination light beam and the image light beam. The following inequalities are satisfied:

$$0.9 \leq \theta 2/\theta 1 \leq 1.1$$

$$\theta 2 < \theta 3$$

$$0.2 \leq \theta 3/\theta 4 \leq 1.5$$

where θ1 is a divergence angle of the light beam emitted from the light source unit, θ2 is a divergence angle of the illumination light beam emitted from the light guide member, θ3 is an divergence angle of the image light beam emitted from the light-distribution-angle conversion element, and θ4 is twice as large as a numerical aperture of the optical system. An image display system having the above image display apparatus also constitutes another aspect of the disclosure.

Further features of various embodiments of the disclosure will become apparent from the following description of embodiments with reference to the attached drawings.

BRIEF DESCRIPTION OF THE DRAWINGS

FIG. 1 illustrates the configuration of an image display apparatus according to Example 1.

FIGS. 2A and 2B illustrate the configuration of an incident deflection element according to Example 1.

FIG. 12 illustrates the configuration around the image generating element according to Example 1.

FIGS. 13A and 13B illustrate the resolving sense in Example 1.

DESCRIPTION OF THE EMBODIMENTS

Figures 3A, 3B, 3C, 3D, 4A, 4B:
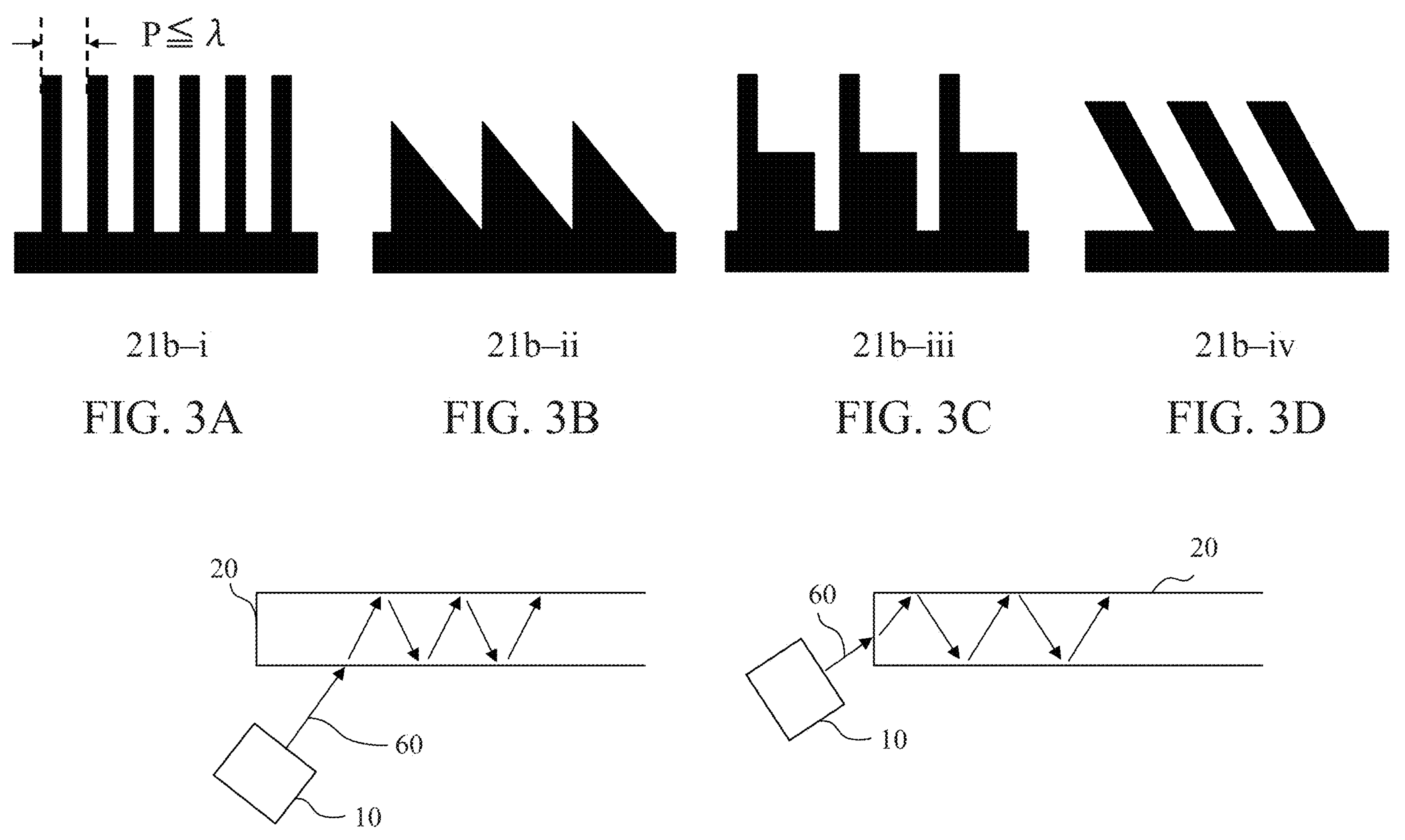
FIGS. 3A, 3B, 3C, and 3D illustrate the configuration of another incident deflection element according to Example 1.
FIGS. 4A and 4B illustrate the configuration of yet another incident deflection element according to Example 1.

Referring now to the accompanying drawings, a description will be given of embodiments according to the disclosure.

Example 1

FIG. 1 illustrates the configuration of an image display apparatus according to Example 1. The image display apparatus includes an image generator 100 and an optical system 50, and guides an image light beam 80 generated by the image generator 100 to an observation side or a projection side via the optical system 50 so that an observer (viewer) can observe (view) it as an image.

In the image generator 100, a parallel light beam 60 emitted from a light source unit 10 is deflected by an incident (light) deflector 21 provided on a surface of the light guide plate 20 as a light guide member and enters a light guide plate 20. The light beam incident on the light guide plate 20 propagates while being internally reflected (total reflection) within the light guide plate 20, and is divided into a plurality of partial light beams and deflected by the exit (light) deflector 22 provided on the surface of the light guide plate 20. Each partial light beam is guided to the image generating element 30 as an illumination light beam 70. The image generating element 30 as a light modulation element generates an image light beam **70*a* by modulating the illumination light beam 70 incident from the light guide plate 20** according to an image signal input from the outside device.

FIGS. 2A and 2B illustrate an example of the incident deflector 21. Each of incident deflectors **21*a*-*i* and 21*a*-*ii* is a prism element configured to refract or reflect the light beam 60 from the light source unit 10 and to deflect it at an angle necessary for propagation within the light guide plate 20**.

FIGS. 3A, 3B, 3C, and 3D illustrate another example of the incident deflector 21. Each of the incident deflectors **21*b*-*i*, 21*b*-*ii*, 21*b*-*iii*, and 21*b*-*iv* is a diffractive optical element (DOE) having a grating structure with a fine pitch P equal to or less than the wavelength λ of the light beam 60, and the light beam 60 from the light source unit 10 is deflected by diffraction and guided to the light guide plate 20. The DOE as the incident deflector 21 can achieve a thin structure with reduced physical irregularities. The DOE having a grating structure with a pitch equal to or less than the wavelength has optical anisotropy relative to polarized light. In this example, the light beam 60 emitted from the light source unit 10 is S-polarized light, and the incident deflectors 21*b*-*i* to 21-*iv* have a characteristic of diffracting S-polarized light. Therefore, the S-polarized light beam 60 from the light source unit 10 is diffracted and guided into the light guide plate 20**. The shape, height, refractive index, etc. of the grating structure for controlling the efficiency and diffraction angle for each diffraction order may be set according to the requirements of the image display apparatus. The incident deflector may use a holographic element having a deflecting action on a light beam and anisotropy on polarized light.

FIGS. 4A and 4B illustrate an example of a light guide plate 20 having no incident deflector. Introducing the light beam 60 from the light source unit 10 into the incident surface of the light guide plate 20 from a direction tilted relative to its normal line enables the light beam 60 to be guided into the light guide plate 20 by the refraction effect of the incident surface of the light guide plate 20.

Figure 5A:
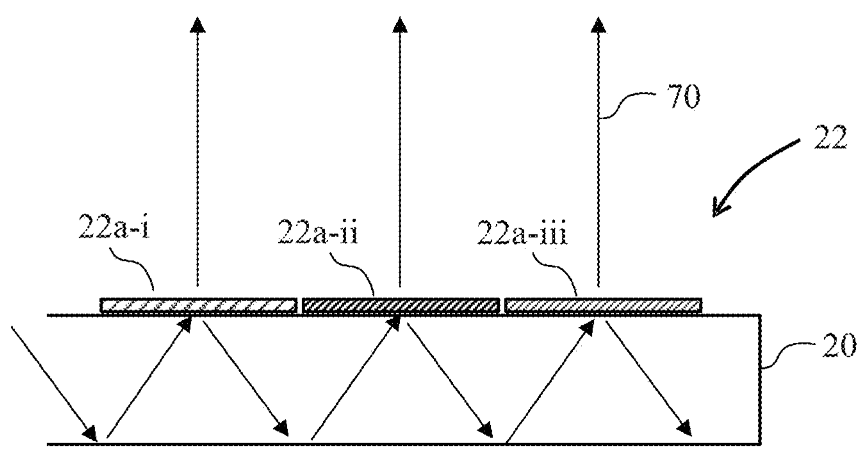
FIGS. 5A, 5B, and 5C illustrate the configuration of an exit deflection element according to Example 1.
Figure 5B:
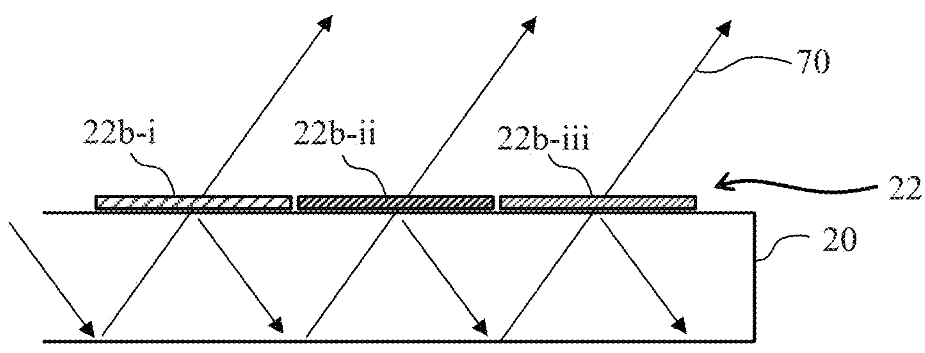
Figure 5C:
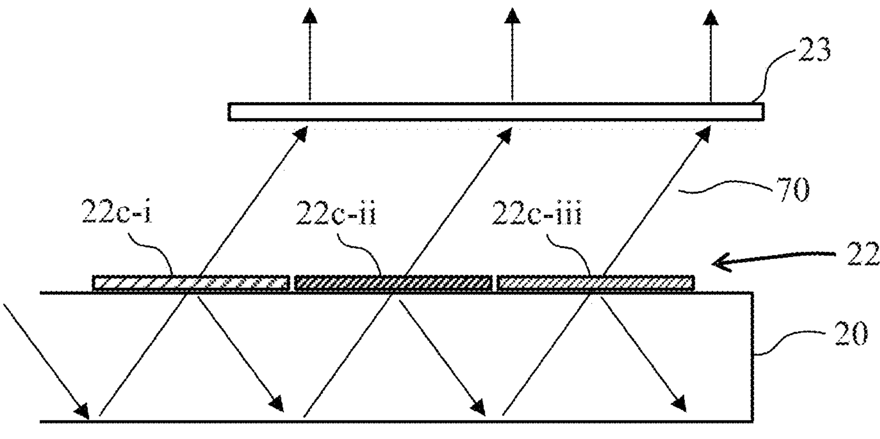

In FIG. 1, the light beam 60 that has propagated within the light guide plate 20 exits at the exit deflector 22 toward the image generating element 30 as the illumination light beams 70 after the light beam 60 is divided into a plurality of partial light beams in the x direction in FIG. 1. FIGS. 5A, 5B, and 5C illustrate the configuration of the exit deflector 22. In order to improve the luminance uniformity on the image generating element 30 as a surface to be irradiated, the exit deflector 22 has a plurality of (first to third) regions (**22*a*-*i*, 2*a*-*ii*, 22*a*-*iii*), (22*b*-*i*, 22*b*-*ii*, 22*b*-*iii*), and (22*c*-*i*, 2*c*-*ii*, 22*c*-*iii*) having different output efficiencies. As illustrated in Table 1, properly setting the output efficiency of each of the plurality of regions can make uniform an exit light amount from the exit deflector 22**.

TABLE 1

| | First Region 22a-i, 22b-i, 22c-i | Second Region 22a-ii, 22b-ii, 22c-ii | Third Region 22a-iii, 22b-iii, 22c-iii |
|---|---|---|---|
| Incident light amount | 1.0 | 0.67 | 0.33 |
| Output Efficiency | 0.33 | 0.5 | 1.0 |
| Exit Light Amount | 0.33 | 0.33 | 0.33 |
| Light Amount Propagating to Next Region | 0.67 | 0.33 | 0 |

The exit deflector 22 illustrated in FIG. 5A includes the DOE illustrated in any one of FIGS. 3A, 3B, 3C, and 3D, and output efficiency and deflecting action are controlled by the same element. Thereby, the illumination light beams 70 can be uniformly introduced into the incident surface of the image generating element 30 perpendicularly or almost perpendicularly.

Figure 6:
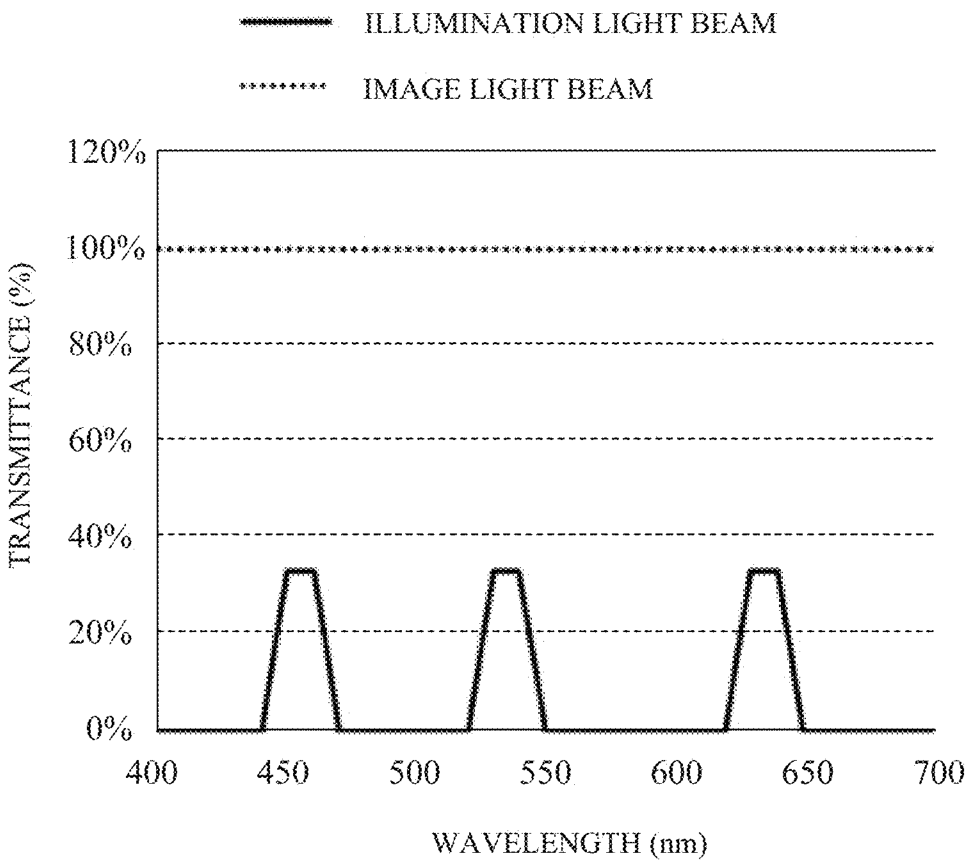
FIG. 6 illustrates the characteristics of a dielectric multilayer film according to Example 1.

The DOE has large manufacturing variations, and the output efficiency may deviate from the desired efficiency. Thus, the exit deflector 22 may include a dielectric multilayer film with little variation in film formation. FIG. 6 illustrates, as an example, the characteristic of the dielectric multilayer film forming the region 22*b-ii* of the exit deflector 22 illustrated in FIG. 5B. Since the region 22*b-ii* has no deflection effect, the illumination light beams 70 emitted from it travel in a direction oblique to the normal to the exit surface of the light guide plate 20. In this case, as illustrated in FIG. 7, the light guide plate 20 may be disposed so that the illumination light beams 70 emitted from the exit deflector 22 enter the image generating element 30 perpendicularly or almost perpendicularly.

Figure 7:
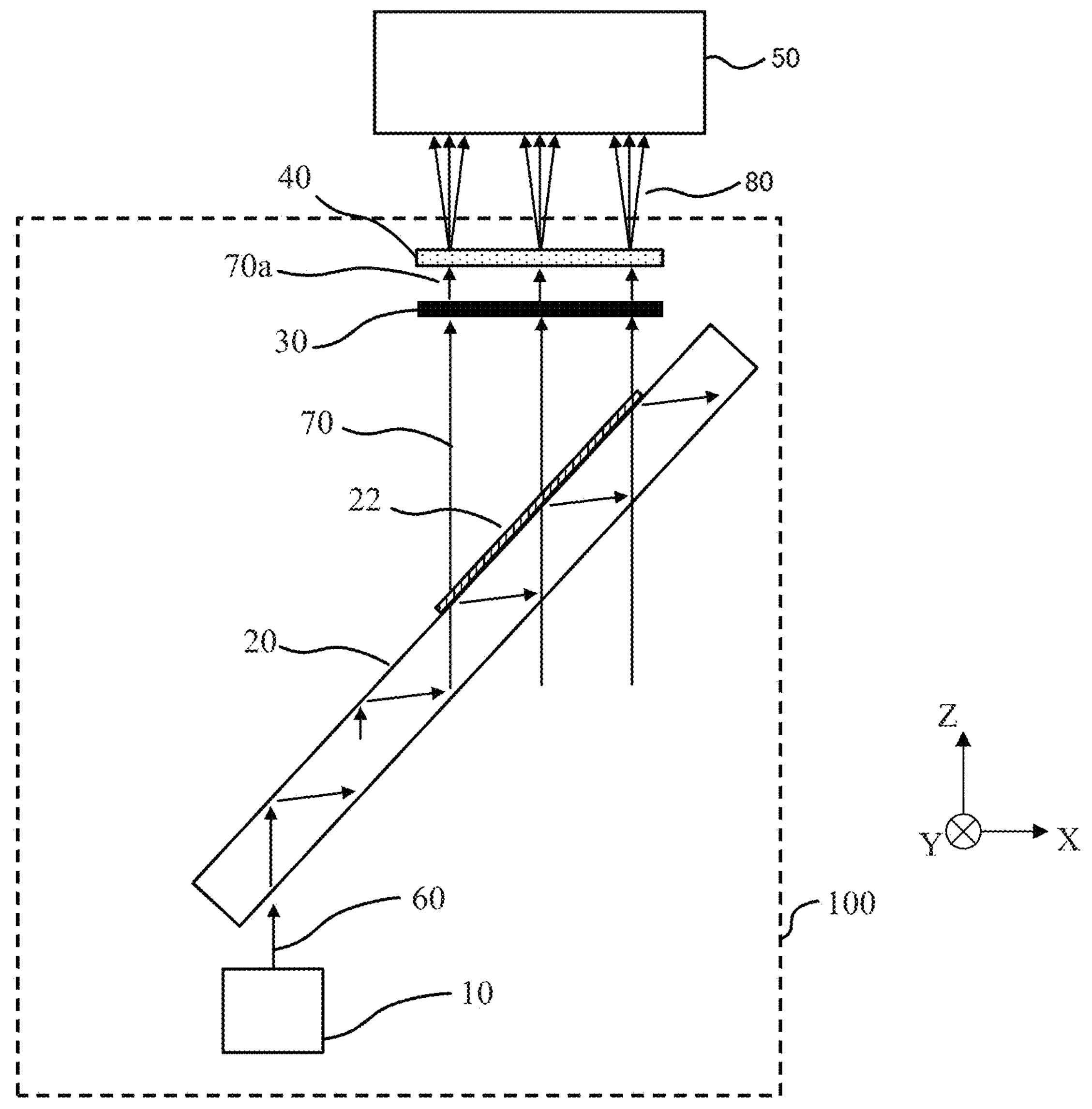
FIG. 7 illustrates another configuration of the image display apparatus according to Example 1.

In a case where the arrangement illustrated in FIG. 7 is difficult, as illustrated in FIG. 5C, a deflection element 23 may be disposed between the exit deflector 22 and the image generating element 30 so that the illumination light beams 70 emitted obliquely from the exit deflector 22 are perpendicularly or almost perpendicularly introduced into the image generating element 30. The deflection element 23 may have any one of refraction, reflection, and diffraction effect on the illumination light beam 70.

Figure 8A:
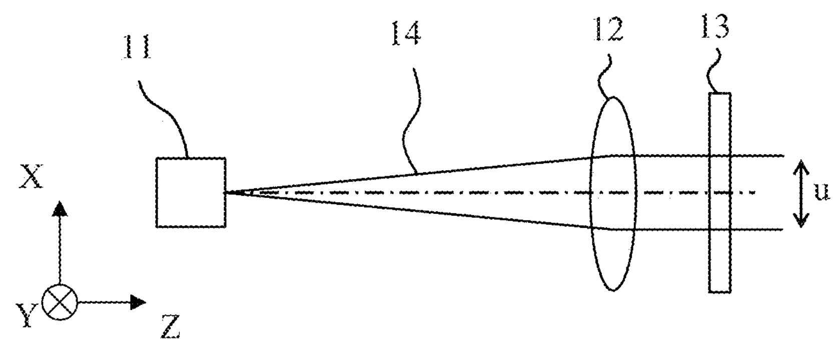
FIGS. 8A, 8B, and 8C illustrate the configuration of a light source unit according to Example 1.
Figure 8B:
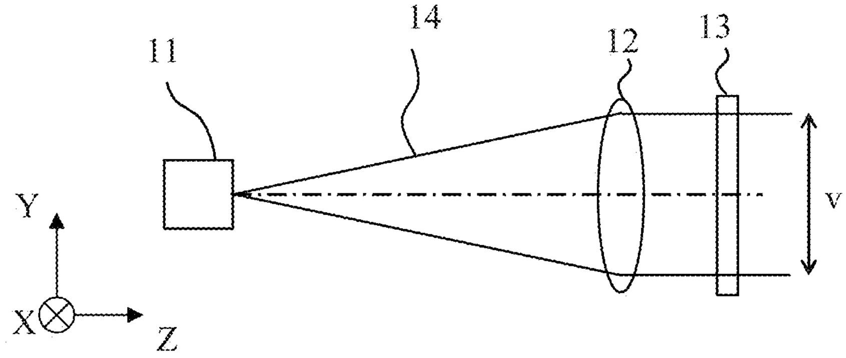
Figure 8C:
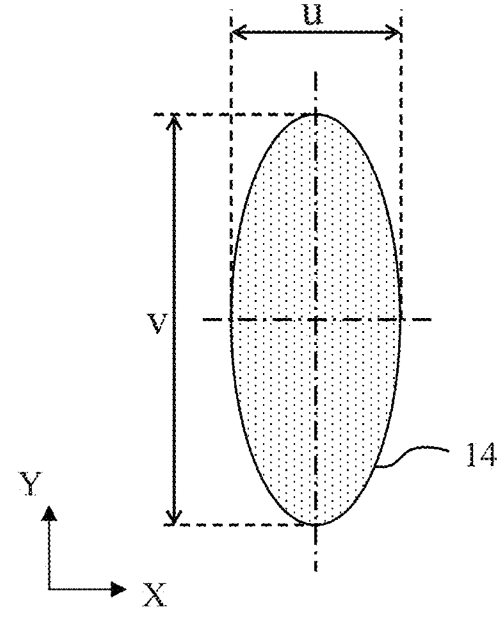
Figures 9, 10A:
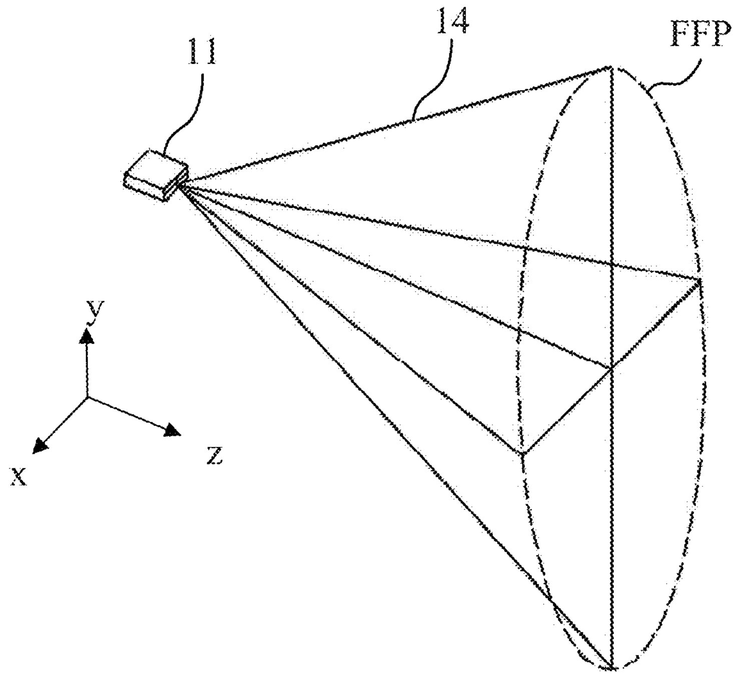
FIG. 9 illustrates the configuration of another light source unit according to Example 1.
FIGS. 10A, 10B, and 10C illustrate the configuration of still another light source unit according to Example 1.

FIGS. 8A and 8B illustrate the configuration of the light source unit 10. The light source unit 10 includes a light emitter 11, a collimator lens 12, and a mask 13. FIG. 8C illustrates a section of a light beam 14 emitted from the light emitter 11. The light emitter 11 is a semiconductor laser element. The light beam 14 as linearly polarized light emitted from the light emitter 11 in the z direction has different light distribution angles u and v in the x and y directions, as illustrated in FIGS. 8A and 8B. Therefore, as also illustrated in FIG. 9, a section (FFP) of the light beam 14 on the xy plane is elliptical. The light beam 14 having an elliptical section has the same focal length in the x and y directions. The collimator lens 12 collimates the light beam.

A light beam having an elliptical section can be shaped by an anamorphic collimator lens system and a substantially circular collimated light beam can be emitted from the light source unit 10.

The mask 13 placed after the collimator lens 12 shapes the light beam 14. The opening shape of the mask 13 has a shape similar to that of each divided region of the exit deflector 22.

Figure 10B:
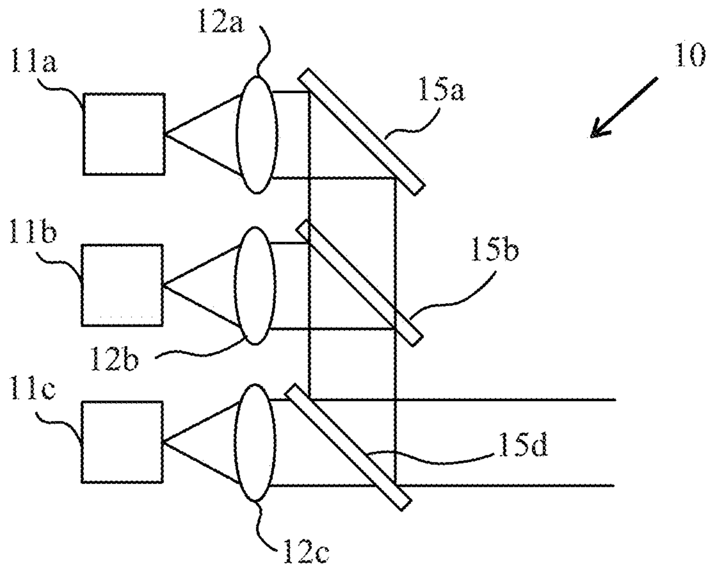
Figure 10C:
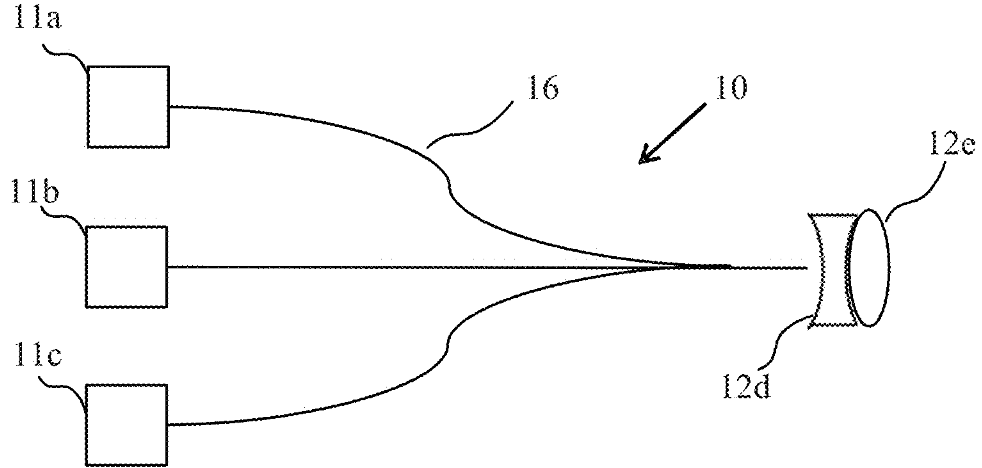

In FIGS. 8A, 8B, and 9, the light source unit 10 has a single light emitter 11. In order to display a colored image, the light source unit 10 may include at least two (three in this example) light emitters 11*a* to 11*c* as illustrated in FIGS. 10A, 10B, and 10C. Then, the light beams of three mutually different wavelengths from these light emitters 11*a* to 11*c* may be introduced into a single light guide plate 20.

In FIGS. 10A and 10B, the light emitter 11*a* is a red semiconductor laser device that emits red laser light in the wavelength range of 620 to 650 nm, the light emitter 11*b* is a blue semiconductor laser device that emits blue laser light in the wavelength range of 440 to 470 nm, and the light emitter 11*c* is a green semiconductor laser element that emits green laser light in a wavelength range of 520 to 550 nm. The light beams emitted from the light emitters 11*a* to 11*c* are collimated into parallel light beams by collimator lenses 12*a* to 12*c* provided for each light emitter, then combined by combining elements 15*a* to 15*c*, and emitted as white light from the light source unit 10. The combining elements 15*a* to 15*c* can use wavelength-selective dichroic filters, polarization-selective polarization beam splitters, and the like. The combining elements 15*a* to 15*c* can use illustrated plate-shaped elements, prism-shaped elements whose interiors are filled with glass or resin, and the like.

A green semiconductor laser element that emits green laser light, which is important for determining the luminance of an image display apparatus, is disposed as the light emitter 11*c* so as to achieve a small number of optical elements through which the green laser light passes and a short optical path for a collimated light beam in order to reduce loss.

Since the characteristic of the red semiconductor laser element significantly changes due to temperature, the red semiconductor laser element is disposed as the light emitter 11*a* in which the volume of an unillustrated heat sink, which is a heat radiating mechanism, can be most easily secured within the light source unit 10.

In the configuration illustrated in FIG. 10B, the green laser beam from the light emitter 11*c* transmits through a combining element 15*d* and is combined with the red and blue laser beams. This configuration can reduce the efficiency reduction caused by an alignment error between the light emitter 11*c* and the combining element 15*d*, more effectively than the configuration illustrated in FIG. 10A.

As in the configuration illustrated in FIG. 10C, the laser beams emitted from the light emitters 11*a* to 11*c* may be combined via optical waveguides 16 and then emitted from lenses 12*d* and 12*e*. In this case, since the combined laser light beams emitted from the optical waveguides 16 are coaxial white light, a collimator lens for each light emitter is not required. However, in order to correct aberrations for each color, a lens 12*d* having negative refractive power and a lens 12*e* having positive refractive power are provided. By making the sectional shape of the optical waveguide 16 circular or rectangular with equal widths in the upper, lower, left, and right directions, the section (FFP) of the light beam emitted from the optical waveguides 16 can also be made circular.

In FIG. 1, in using a DOE for at least one of the incident deflector 21 and the exit deflector 22, since the diffraction angle depends on the wavelength of a light beam incident on them, a plurality of light guide plates 20 are required according to the wavelengths of the light emitters to be used. On the other hand, in a case where a dielectric multilayer film is used for at least one of the incident deflector 21 and the exit deflector 22, light beams of a plurality of wavelengths can be propagated by the single light guide plate 20. This is because by using a semiconductor laser element with a narrow band of the emission spectrum as the light emitter, a dielectric multilayer film can be provided that satisfies the characteristic for each wavelength.

In the image generator 100 thus configured, the light beam 60 emitted from the light source unit 10 is converted into parallel light beams by the collimator lens system disposed within the light source unit 10, as described above. The semiconductor laser element in the light source unit 10 has a very small light emitting point (such as 50 μm or less) and a narrow light distribution angle (for example, the full width at half maximum (FWHM) of 25 degrees or less), so the collimator lens system emits light beams with very high parallelism. This example assumes the light distribution characteristic of the light beam 60 of FWHM±2 deg. In order to reduce the output efficiency variation of the exit deflector 22 described above, the light distribution characteristic of the light beam 60 may be set to a range of FWHM±1 deg. In order to reduce the incident position variation of the light beams that enter the plurality of regions of the exit deflector 22, the light distribution characteristic of the light beam 60 may be adjusted to a range of FWHM±0.5 deg.

The incident surface and exit surface of the light guide plate 20 are arranged with high parallelism, and the light beam 60 propagates within the light guide plate 20 with its angle maintained. Therefore, the light distribution characteristic of the illumination light beam 70 that propagates within the light guide plate 20 and exits from the exit deflector 22 is approximately equal to the light distribution characteristic of the light beam 60 that exits from the light source unit 10 and enters the light guide plate 20. That is, the following inequality may be satisfied:

$$0.9 \leq \theta 2/\theta 1 \leq 1.1 \quad (1)$$

where θ1 is a divergence angle (FWHM) as a light distribution angle of the light beam 60, and θ2 is a divergence angle (FWHM) as a light distribution angle of the illumination light beam 70.

The illumination light beams 70 emitted from the exit deflector 22 enter the image generating element 30 while maintaining the light distribution characteristic of inequality (1). The image generating element 30 according to this example is a transmission type liquid crystal element, and by driving the liquid crystal according to an image signal inputted from the outside device, the illumination light beams 70 incident from the front surface as an incident surface are converted into the image light beams 70*a* according to the image signal and emitted from the back surface as the exit surface. The light distribution characteristic of the light beam hardly changes before and after the light beam passes through the image generating element 30. Since the transmission type liquid crystal element has an incident angle characteristic, the illumination light beam 70 may be introduced perpendicularly (from the normal direction of the incident plane) or almost perpendicularly into the incident plane of the transmission type liquid crystal element. The image light beam emitted from the image generating element 30 is emitted from the image display apparatus via the optical system 50.

A ray intake angle (2NA: NA is numerical aperture) of the optical system 50 varies depending on the requirements of the image display apparatus. As described above, the image light beams 70*a* emitted from the image generating element 30 maintains the light distribution characteristic illustrated in inequality (1). In other words, it is necessary to set the light distribution characteristic of the image light beams 70*a* in accordance with the ray intake angle (2NA) required by the optical system 50. Therefore, in this example, a light-distribution-angle (LDA) conversion element 40 is disposed between the image generating element 30 and the optical system 50.

The image light beams 70*a* emitted from the image generating element 30 enter the LDA conversion element 40, are converted into image light beams 80 having a light distribution characteristic (light distribution angle) different from that of the image light beams 70*a*, and enter the optical system 50. The following inequalities may be satisfied:

$$\theta 2 < \theta 3 \quad (2)$$

$$0.2 \leq \theta 3/\theta 4 \leq 1.5 \quad (3)$$

where θ2 is a divergence angle (FWHM) of the illumination light beams 70 emitted from the light guide plate 20, θ3 is a divergence angle (FWHM) of the image light beams 80 directed from the LDA conversion element 40 toward the optical system 50, and θ4 is an intake angle (2NA) of the optical system 50.

In a case where the upper limit of inequality (3) is too large, the intake efficiency of the optical system 50 may lower, so inequality (3) may be replaced with inequality (3a) below:

$$0.2 \leq \theta 3/\theta 4 \leq 1.2 \quad (3a)$$

In a case where the lower limit of inequality (3a) is too small, the visibility of the displayed image may lower, so inequality (3) may be replaced with inequality (3b):

$$0.5 \leq \theta 3/\theta 4 \leq 1.2 \quad (3b)$$

By satisfying the above inequality, the image light beams 80 that meet the requirements of the image display apparatus can be generated with high efficiency.

Figure 11A:
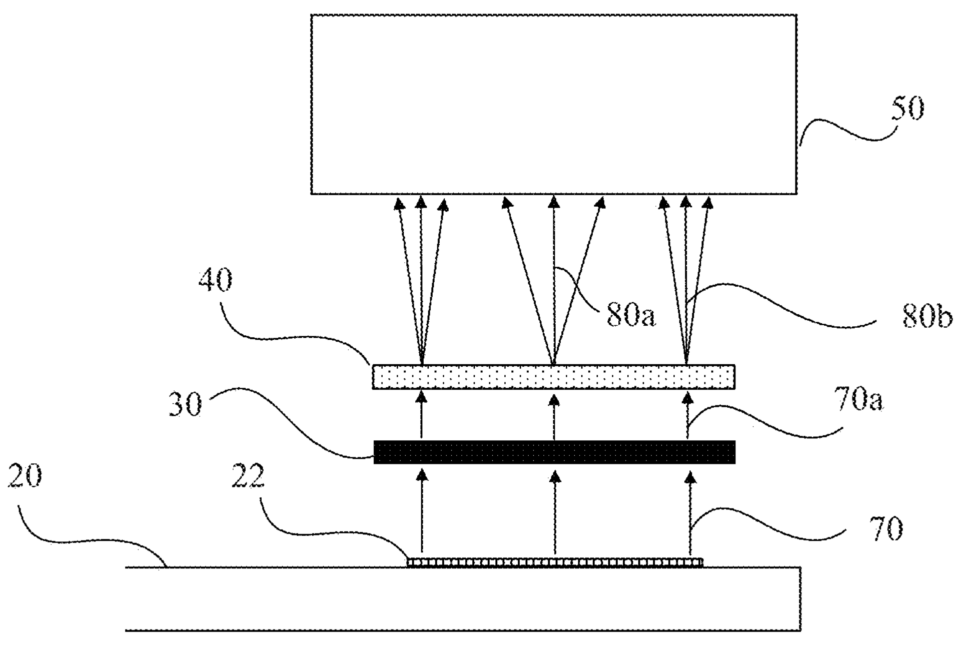
FIGS. 11A and 11B illustrate the characteristics of a light-distribution-angle conversion element according to Example 1.

The LDA conversion element 40 may be a lens diffusion plate having a microlens array, or a holographic element with various patterns formed on its surface. The LDA conversion element 40 may have different characteristics on the optical axis (central portion) and off the optical axis (peripheral portion). In FIG. 11A, the divergence angles of the image light beams 80 are different between the central portion and the peripheral portion. The following inequality may be satisfied:

$$\theta 3\mathrm{a} > \theta 3\beta \quad (4)$$

where θ3α is a divergence angle 80*a* of the image light beam 80 emitted from the central portion, and θ3β is a divergence angle 80*b* of the image light beam 80 emitted from the peripheral portion. This configuration can reduce a light amount loss at the peripheral portion, and improve both a light amount and a peripheral light amount ratio.

Figure 11B:
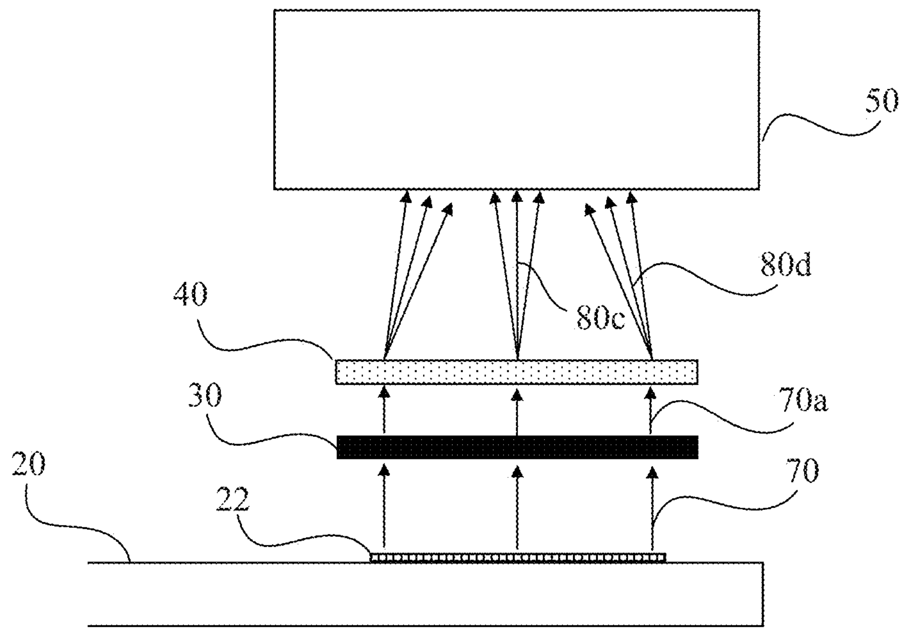

In FIG. 11B, a principal ray 80*c* of the image light beam 80 emitted from the central portion of the LDA conversion element 40 and a principal ray 80*d* of the image light beam 80 emitted from the peripheral portion have different angles, that is, a principal ray 80*d* from the peripheral portion is tilted relative to a principal ray 80*c* from the central portion. As illustrated in FIG. 11B, the size of the subsequent optical system 50 can be reduced by providing the LDA conversion element 40 with an LDA control characteristic in which the principal ray 80*d* from the peripheral portion converges (so as to approach the principal ray 80*c* from the central portion). The principal ray in this example is a ray located at the center of the image light beam emitted from each region of the image generating element 30 and each region of the LDA conversion element 40, and is a ray located at the center of the illumination light beam emitted from each region of the exit deflector 22 of the light guide plate 20.

Referring now to FIGS. 12, 13A, and 13B, a description will be given of the resolution of a displayed image. Generally, in order to properly display an image, the position of the back focus BF of the optical system 50 and the exit surface (image display surface) of the image generating element 30 are made to coincide, as illustrated in FIG. 12.

However, if the LDA conversion element 40 is placed in the optical path of the optical system 50, an original image (optical image) illustrated in FIG. 13A becomes an image with reduced resolution as illustrated in FIG. 13B. In this example, as described above, light beams with high parallelism are guaranteed as the light beams entering the LDA conversion element 40. In this case, the optical image on the image generating element 30 and the optical image on the LDA conversion element 40 are approximately equal. That is, the optical image on the LDA conversion element 40 can be regarded as a secondary image of the optical image on the image generating element 30. Therefore, by making the position of the back focus BF of the optical system 50 substantially coincide with the position of the LDA conversion element 40, the resolution deterioration of the displayed image can be avoided.

More specifically, as illustrated in FIG. 12, the following inequality may be satisfied:

$$0.9 \leq BL/BF \leq 1.1 \tag{5}$$

where BF is a back focus of the optical system 50, and BL is a distance on the optical axis between a vertex of an optical surface (lens surface) closest to the image generating element 30 in the optical system 50 and an exit surface of the LDA conversion element 40.

Figures 14, 15:
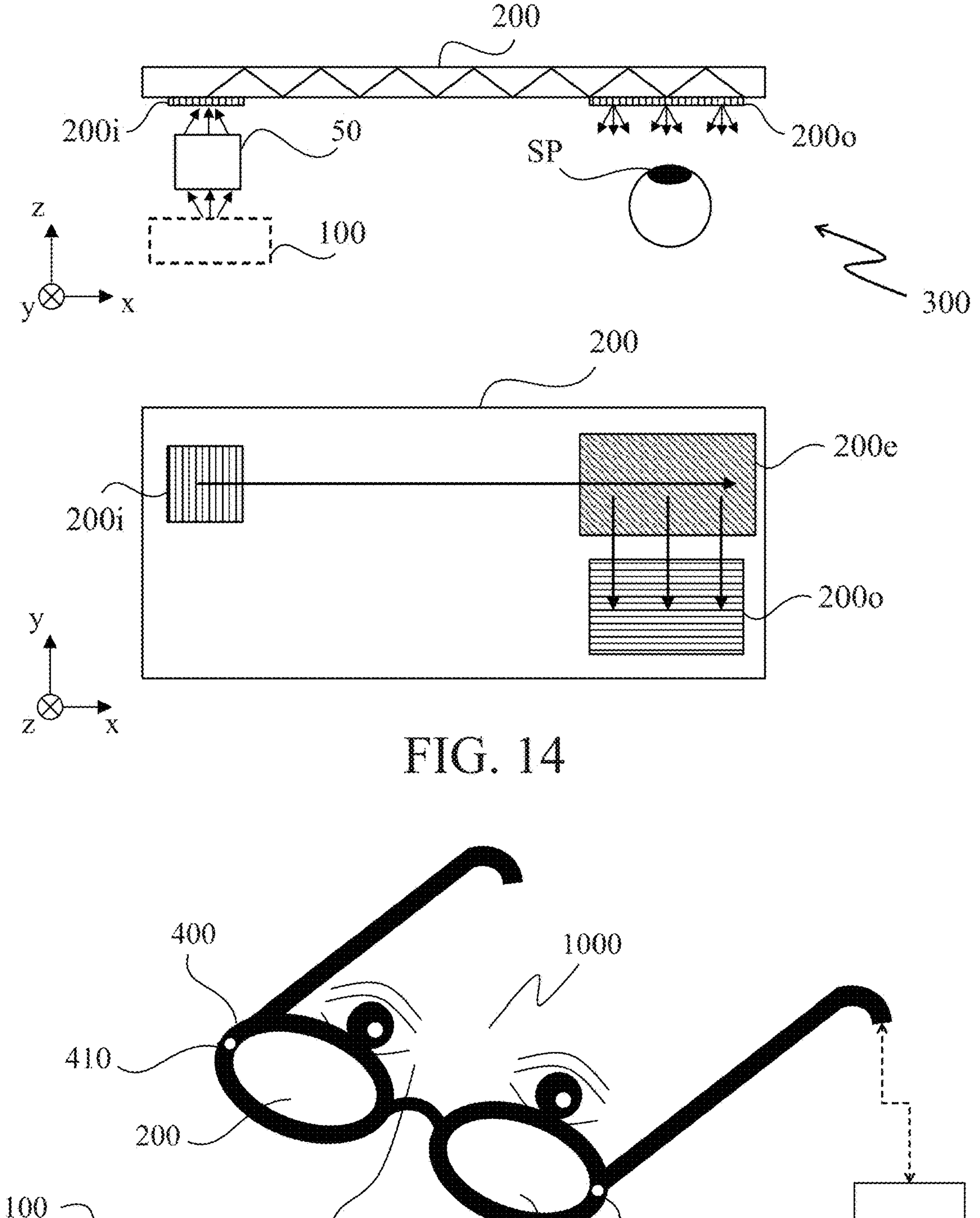
FIG. 14 illustrates the configuration around the image generating element in the image display apparatus according to Example 1.
FIG. 15 illustrates an application example of the image display apparatus according to Example 1.

FIG. 14 illustrates the configuration of an image display system 300 to which the image display apparatus according to this example is applied. The upper view in FIG. 14 illustrates an xz section, and the lower view illustrates an xy section. The image light beam emitted from the image generator 100 and further emitted from the optical system 50 is deflected by an incident deflector 200*i* provided on an eyepiece light guide plate 200, enters the eyepiece light guide plate 200 as an eyepiece optical system, and enters a divider/deflector 200*e* while being totally reflected within the eyepiece light guide plate 200. The image light beam incident on the divider/deflector 200*e* is divided into a plurality of partial light beams in the x direction, deflected, and guided to an exit deflector 2000.

The image light beam incident on the exit deflector 2000 is divided into a plurality of partial light beams in the y direction and deflected toward the observer's eye (pupil) SP. In FIG. 14, the direction in which the image light beam is deflected by the incident deflector 200*i* (x direction) and the direction in which the image light beam is deflected by the divider/deflector 200*e* (y direction) are orthogonal to each other. Even if they are not orthogonal, the image light beam incident on the eyepiece light guide plate 200 may be emitted so as to be directed toward the pupil SP. As long as the image light beam emitted from the image generator 100 can be guided to the pupil SP, instead of the eyepiece light guide plate 200, a birdbath optical system using a half-mirror, a refractive optical system using a polarized-light reflective lens or a Fresnel lens, etc. may be used.

FIG. 15 illustrates an HMD and smart glasses using the image display system of FIG. 14. A frame 400 holds the eyepiece light guide plates 200 in front of both eyes of observer 1000, and also holds an image display apparatus corresponding to each of the eyepiece light guide plates 200. The image light beam emitted from the image generator 100 of each image display apparatus is guided to the eye of the observer 1000 via the eyepiece light guide plate 200. Thereby, the observer 1000 can visually recognize displayed images 1100. By presenting displayed images that have parallax to the left and right eyes, the observer can also view a stereoscopic image. A control unit 430 is connected to the frame 400, which controls the driving of the image generating elements in the image generator 100, a light amount from the light source unit 10, and the like. The control unit 430 may be placed outside the frame 400 and communicably connected to the image generator 100 by wire or wirelessly, as illustrated in FIG. 15, or may be placed inside the frame 400.

A first information acquiring unit 410 including a camera configured to acquire pupil information indicating the position and movement (viewpoint or line of sight) of the pupil of the observer 1000 is attached to the frame 400. The control unit 430 corrects the position of the displayed image 1100 (image generation position on the image generating element) based on the pupil information. A second information acquiring unit 420 including a camera configured to acquire external world (surroundings) information is also attached to the frame 400. The control unit 430 adjusts the luminance of displayed image 1100 according to the luminance of the external world obtained from external world information.

Figure 16:
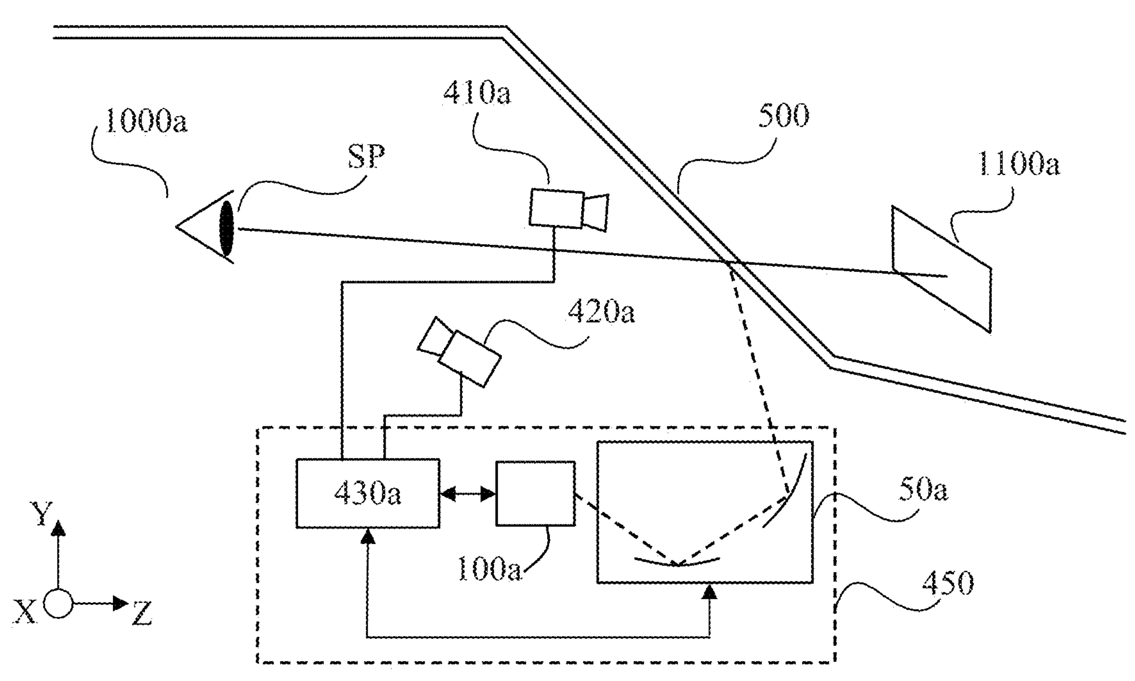
FIG. 16 illustrates another application example of the image display apparatus according to Example 1.

FIG. 16 illustrates a head-up display (HUD) 450 as an on-board (in-vehicle) image display system to which the image display apparatus according to this example is applied. The HUD 450 includes an image generator 100*a*, a projection optical system 50*a*, a first information acquiring unit 420*a*, a second information acquiring unit 410*a*, and a control unit 430*a*. The HUD 450 is mounted on an automobile 500 as a movable apparatus, and projects an image (virtual image) 1100*a* to support a user (driver or passenger) of the automobile 500 onto a windshield as a projection surface via a projection optical system 50*a*. The movable apparatus may be a railway, a ship, an airplane, etc. in addition to an automobile.

The first information acquiring unit 420*a* includes a camera configured to acquires pupil information indicating the position and movement (viewpoint or line of sight) of the user's pupil SP. The control unit 430*a* corrects the position of the displayed image 1100*a* (image generated position on the image generating element) based on the pupil information. The second information acquiring unit 410*a* includes a camera configured to acquires external world (surroundings) information. The control unit 430*a* adjusts the luminance of the displayed image 1100*a* according to the luminance of the outside world obtained from the external world information, or displays the displayed image 1100*a* by superimposing it on the external world image obtained from the external world information. The second information acquiring unit 410*a* may acquire not only the front external world information but also the rear and side external world information. The control unit 430*a* also determines a likelihood of collision of the automobile 500 with an obstacle (object) obtained from the external world information, and issues a warning in a case where the collision is likely, control either the brakes or the steering. The warning method includes generating a warning sound, displaying warning information on the display screen of the car navigation system, and generating vibrations to a seat belt and steering wheel.

Figure 17:
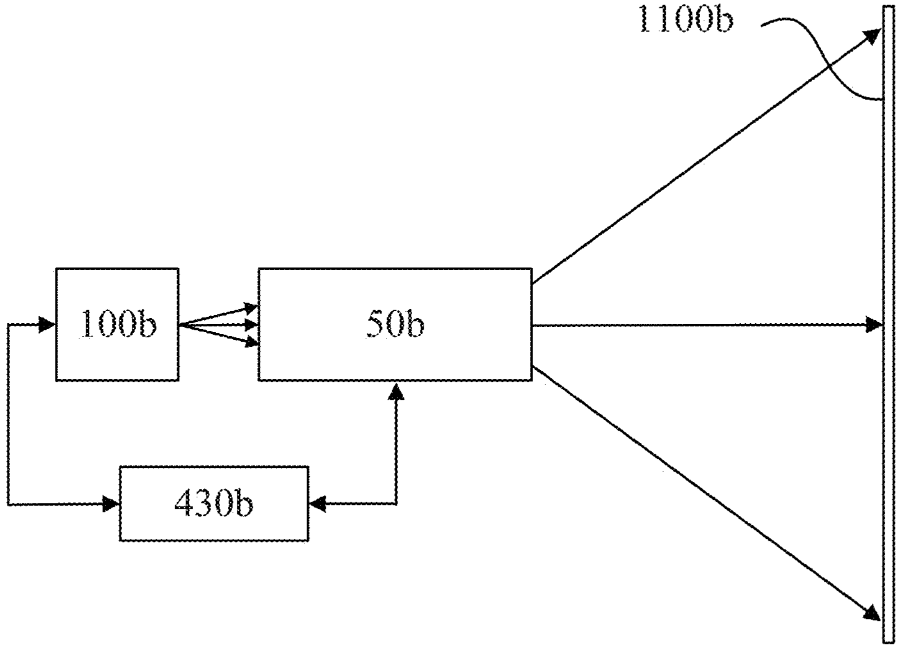
FIG. 17 illustrates still another application example of the image display apparatus according to Example 1.

FIG. 17 illustrates the configuration of a real image projection system (projector) as an image display system to which the image display apparatus according to this example is applied. The image light beam emitted from the image generator 100*b* is projected onto a projection surface 1100*b* such as a screen via a projection optical system 50*b*. The projection surface 1100*b* may be a flat surface or a curved surface. The control unit 430*b* drives the image generating element according to an image signal input from the external device, adjusts a light amount of the light source unit 10, and adjusts the zoom and focus of the projection optical system 50*a*.

The image display systems illustrated in FIGS. 14 to 17 may use an image generator according to another example described below instead of the image generator 100 according to this example.

Example 2

Figure 18:
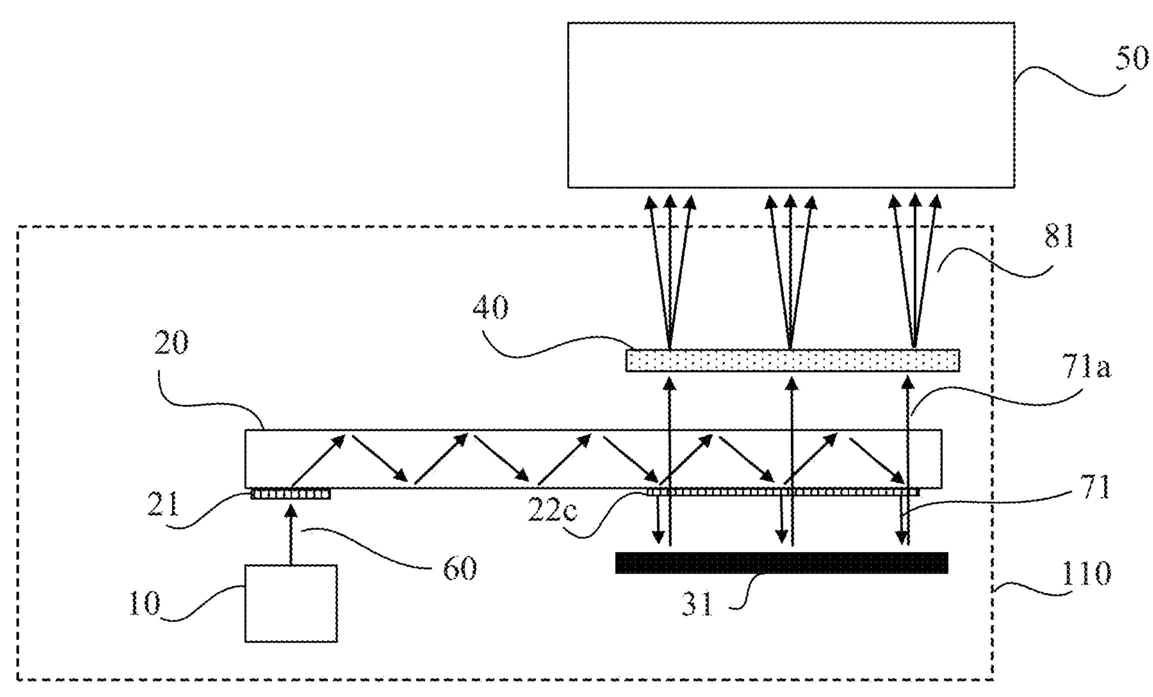
FIG. 18 illustrates the configuration of an image generating apparatus according to Example 2.

FIG. 18 illustrates the configuration of an image display apparatus according to Example 2. The image display apparatus includes an image generator 110 and an optical system 50. The image generator 110 according to this example is different from that according to Example 1 in that an image generating element 31 is a reflection type liquid crystal element, and those elements, which are corresponding elements in Example 1, will be designated by the same reference numerals and a description thereof will be omitted.

Illumination light beams 71 emitted from the exit deflector 22*c* provided on the light guide plate 20 enter the image generating element 31, are converted into image light beams 71*a*, are reflected, and are emitted toward the exit deflector 22*c*. The light distribution characteristic of the light beam does not change before and after the light beam enters and exits the image generating element 31. Since the reflection type liquid crystal element also has an incident angle characteristic similar to the transmission type liquid crystal element, the illumination light beams 71 may be introduced perpendicularly or almost perpendicularly to the normal to the incident surface of the image generating element 31.

Image light beams 71*a* emitted from the image generating element 31 pass through the exit deflector 22*c* and the light guide plate 20 and enter the LDA conversion element 40. The exit deflector 22*c* according to this example is a DOE having a grating structure finer than the wavelength of incident light, and has optical anisotropy relative to polarized light. More specifically, the exit deflector 22*c* has a characteristic of diffracting S-polarized light and transmitting P-polarized light. Therefore, the light beam 60 as S-polarized light emitted from the light source unit 10 is deflected by the incident deflector 21, propagates through the light guide plate 20, is diffracted by the exit deflector 22*c*, and enters the image generating element 31 as the illumination light beams 71. The illumination light beams 71 are modulated into the image light beams 71*a* at the image generating element 31 and reflected. At this time, the phases of the image light beams 71*a* are modulated by the liquid crystal and the image light beams 71*a* are emitted as P-polarized light.

The image light beams 71*a* as P-polarized light transmit through the exit deflector 22*c* without being diffracted, and further transmit through the light guide plate 20 and enter the LDA conversion element 40. The LDA conversion element 40 diffuses the incident image light beams 71*a* in accordance with the ray intake angle (2NA) required by the optical system 50.

Figure 19:
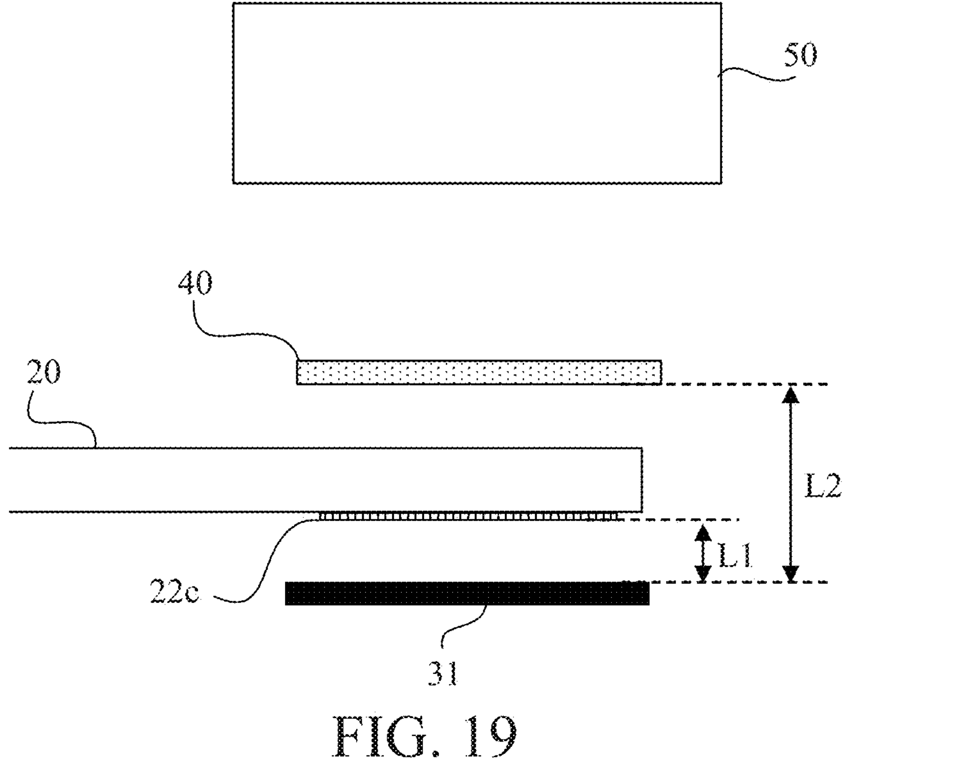
FIG. 19 illustrates the configuration around an image generating element according to Example 2.

In order to transmit the light beam through the exit deflector 22*c* with high efficiency, a light beam with high polarization purity is to enter the exit deflector 22*c*. Therefore, the LDA conversion element 40 is disposed so that the image light beams 71*a* that have passed through the exit deflector 22*c* enter the LDA conversion element 40. The following inequality may be satisfied as illustrated in FIG. 19:

$$L1/L2 < 1 \qquad (6)$$

where L1 is a distance on the optical axis between the exit surface (the exit deflector 22*c*) of the illumination light beams 71 in the light guide plate 20 and the entrance/exit surface of the image generating element 31, and L2 is a distance on the optical axis between the entrance/exit surface of the image generating element 31 and the incident surface of the conversion element 40.

Example 3

Figure 20:
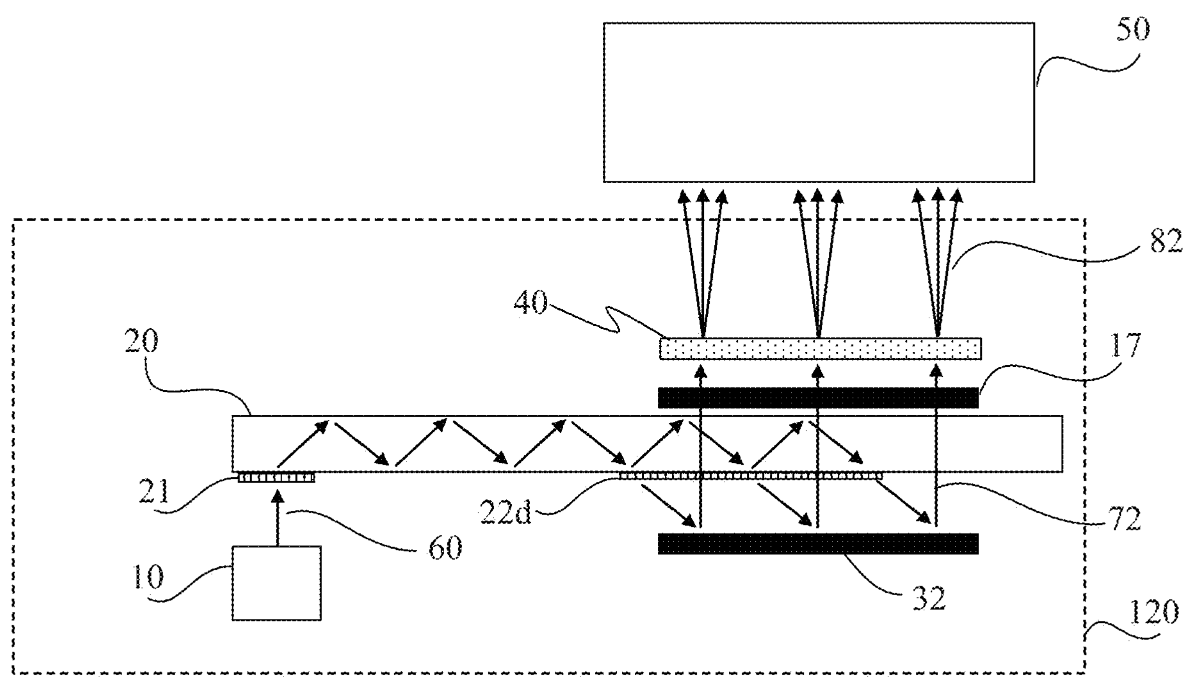
FIG. 20 illustrates the configuration of an image generating apparatus according to Example 3.

FIG. 20 illustrates the configuration of an image display apparatus according to Example 3. The image display apparatus includes an image generator 120 and an optical system 50. The image generator 120 according to this example is different from that of Example 2 in that the image generating element 32 is a reflection type micromirror element (digital micromirror device: DMD) in which minute micromirrors are two-dimensionally arranged, and those elements, which are corresponding elements in Example 2, will be designated by the same reference numerals, and a description thereof will be omitted.

In the reflection type liquid crystal element as the image generating element 31 according to Example 2, the incident angle of the illumination light beam and the exit angle of the image light beam are the same. On the other hand, the DMD as the image generating element 32 according to Example 3 controls the deflecting direction of the reflected image light beam 72*a* by switching the tilt (binary on and off) of the micromirror for each pixel on which the illumination light beam 72 obliquely enters. Since the DMD only controls the light deflecting (traveling) direction, the deflecting direction of the incident illumination light beam does not need to be unified as in a liquid crystal display element.

Figure 21:
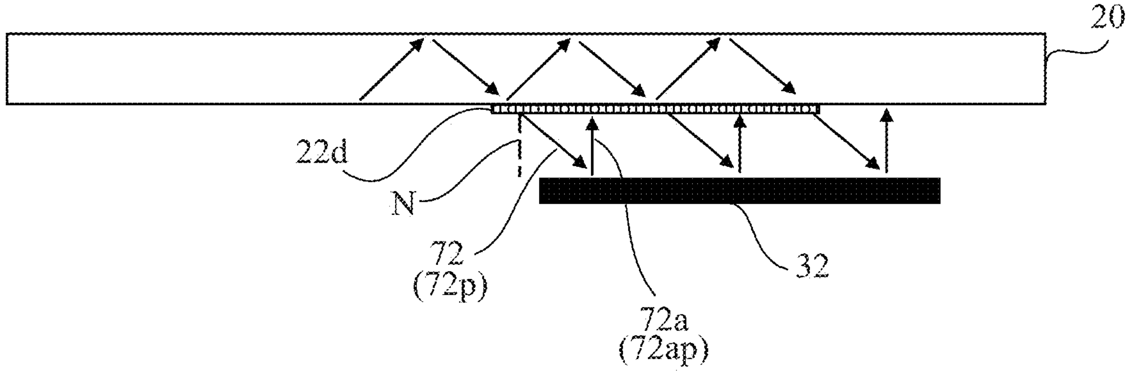
FIG. 21 illustrates the configuration around an image generating element according to Example 3.

As illustrated in FIG. 21, the reflection directions of the illumination light beams 72 emitted from the exit deflector 22*d* are deflected by the image generating element 32 and the illumination light beams 72 are emitted as image light beams 72*a*. The following inequality may be satisfied:

$$20° \leq |\omega 1 - \omega 2| \leq 40° \qquad (7)$$

where ω1 is an angle between the normal N to the exit surface of the light guide plate 20 and the principal ray 72*p* of the illumination light beam 72 emitted from the light guide plate 20, and @2 is an angle between the normal N to the exit surface of the light guide plate 20 and the principal ray 72*ap* of the image light beam 72*a* emitted from the image generating element 32.

Making different the angles of the incident light and the exit light on and from the image generating element so as to satisfy (7) can properly guide the light to the observation side or the projection side. In a case where the value becomes higher than the upper limit, the exit angle of the illumination light beam relative to the exit surface of the light guide plate increases, and light loss increases in the light guide plate. In a case where the value becomes lower than the lower limit, the angle of the image light beam emitted from the image generating element relative to the exit surface of the light guide plate increases, and a light amount guided to the optical system (50) decreases.

An unillustrated non-image light beam reflected by the micromirror in the turning-off state is deflected in a different direction from that of the image light beam 72*a* reflected by the micromirror in the turning-on state, and is emitted to the outside of the optical path of the image light beam 72*a*. This example processes (absorbs, etc.) the non-image light beam within the image generator 120, and disposes a mask 17, as illustrated in FIG. 20, between the light guide plate 20 and the LDA conversion element 40 to block the non-image light beam and prevent the non-image light beam from entering the optical system 50 and from being visually recognized by the observer. As described above, the light beam before entering the LDA conversion element 40 has high parallelism, and it is easy to separate the image light beam and the non-image light beam. Therefore, the mask 17 is placed in the above position.

In a case where a DMD is used as the image generating element 32, the illumination light beams 72 and the image light beams 72*a* are separated by the incident angle on the exit deflector 22*d*, so the exit deflector 22*d* includes a dielectric multilayer film. More specifically, by controlling the transmittance and reflectance according to the incident angle using the incident angle characteristic of the dielectric multilayer film, light incident obliquely on the exit deflector 22*d* is reflected, and light incident vertically or almost vertically transmits it.

Controlling the ratio of the transmittance and reflectance of the light that obliquely enters the exit deflector 22*d* can secure the uniformity of the illumination light beams 72 that enter the entire image generating element 32.

Example 4

Figure 22:
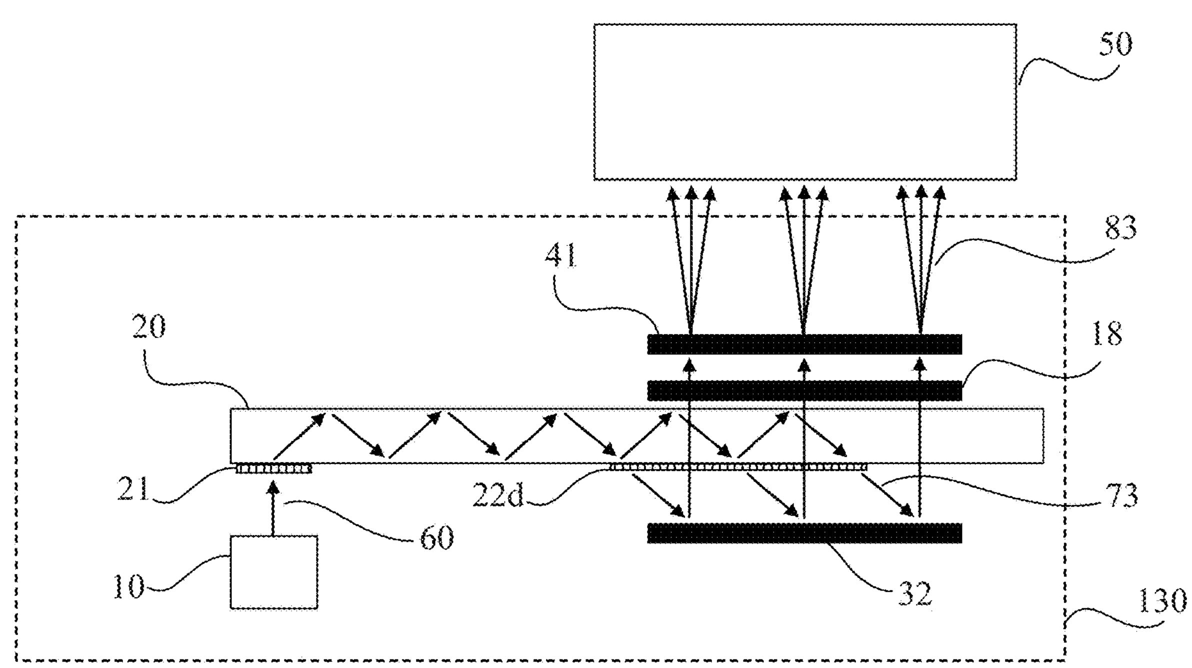
FIG. 22 illustrates the configuration of an image generating apparatus according to Example 4.

FIG. 22 illustrates the configuration of an image display apparatus according to Example 4. The image display apparatus has the same image generator 130 and optical system 50 similarly to Example 3. This example is different from Example 3 in that the light-distribution-angle conversion element 41 is a transmission type liquid crystal element having a microlens array, and those elements, which are corresponding elements in Example 3, will be designated by the same reference numerals, and a description thereof will be omitted.

Figure 23:
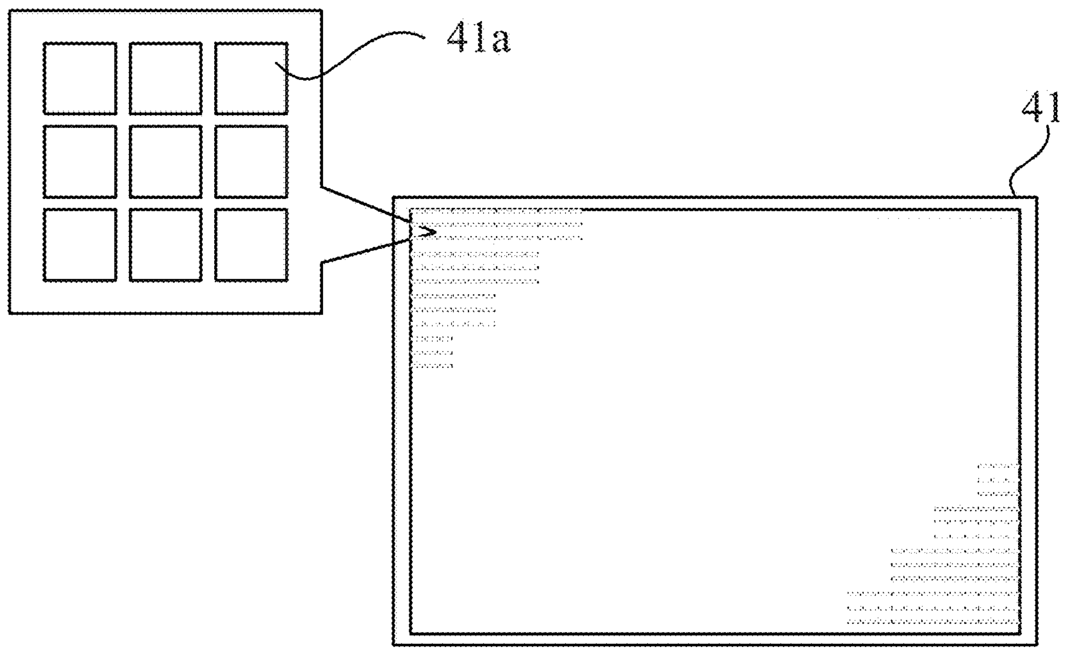
FIG. 23 illustrates the configuration of a light-distribution-angle conversion element according to Example 4.
Figure 24:
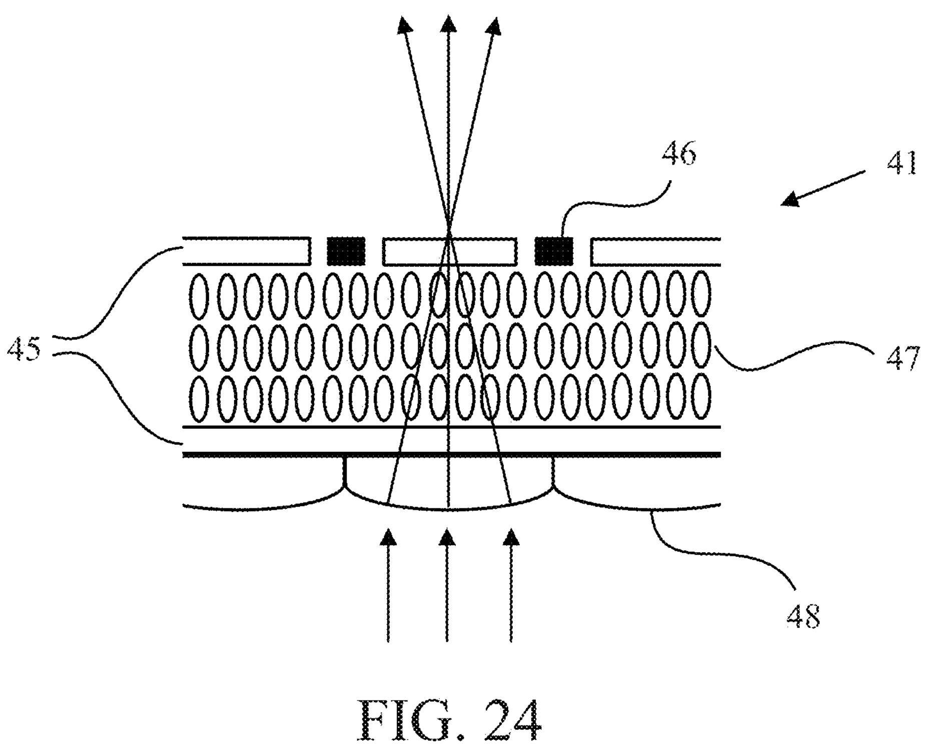
FIG. 24 is another diagram illustrating the configuration of the light-distribution-angle conversion element according to Example 4.

FIGS. 23 and 24 illustrate the configuration of an LDA conversion element 41 according to this example. The LDA conversion element 41 is a self-luminous device having a pixel structure 41*a* in two-dimensional horizontal and vertical directions, as illustrated in FIG. 23.

FIG. 24 illustrates an enlarged model of the pixels in the LDA conversion element 41. Transparent electrodes 45 serving as opposing substrates are filled with liquid crystal molecules 47, and driving circuits 46 are disposed within a pixel structure on one substrate. The transmission type liquid crystal element has a low aperture ratio because the driving circuits 46 are disposed within the pixel structure.

Accordingly, a microlens array 48 having microlenses corresponding to pixels is disposed on the surface which the light beam enters. Since the light beam incident on the LDA conversion element 41 is converged by the microlens array 48 so as to avoid the driving circuits 46, the aperture ratio can be improved. The light beam converged by the microlens array 48 passes through the condensing point and then exits from the LDA conversion element 41 as a diverging light beam. That is, the LDA conversion element 41 has a function of controlling the light distribution angle of the exit light beam.

The LDA conversion element 41 is also an image generating element having a pixel structure. Therefore, an image to be visually recognized by the observer can be displayed using the LDA conversion element 41. In this case, an image generating element (DMD) 32 disposed in the image generator 130 on the upstream side of the LDA conversion element 41 controls the illumination light beams 73 so as to supply the illumination light beams 72 according to an image displayed by the LDA conversion element 41, to the LDA conversion element 41. This configuration can provide dimming for each region within the display surface of the LDA conversion element 41, and enables the observer to visually recognize an image (HDR image) with a wide dynamic range of luminance.

Generally, an optical system that enables an HDR image to be visually recognized requires a relay optical system that performs relay imaging between a plurality of panels. However, in a case where the parallelism of the light beams before entering the LDA conversion element 41 is high as in this example, the HDR image can be visually recognized with a simple configuration that includes no relay optical system.

The dimming region in the LDA conversion element 41 may be a region including one or more pixels. The LDA conversion element 41 illustrated in this example may be used in place of the LDA conversion element 40 in the other examples described above.

Example 5

Figure 25:
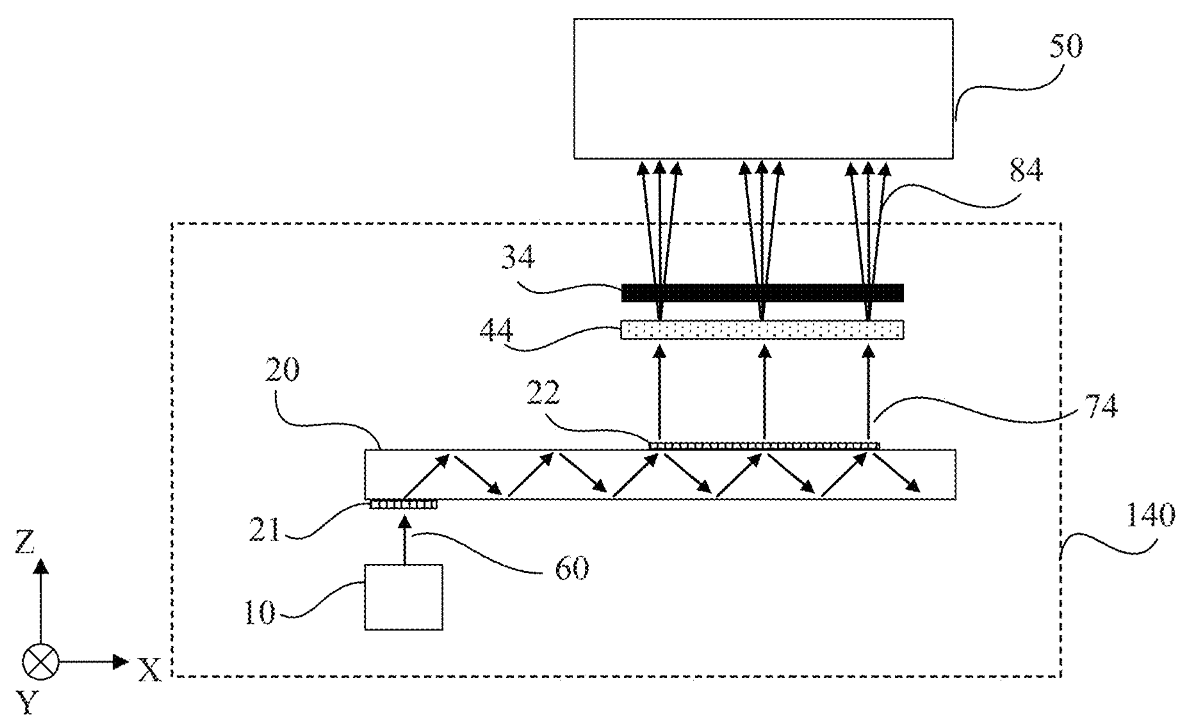
FIG. 25 illustrates the configuration of an image generating apparatus according to Example 5.

FIG. 25 illustrates the configuration of an image display apparatus according to Example 5. The image display apparatus includes an image generator 140 and an optical system 50. This example is different from Example 1 in that a LDA conversion element 44 is disposed between a light guide plate 20 and an image generating element 34 as a transmission type liquid crystal element, and those elements, which are corresponding elements in Example 1, will be designated by the same reference numerals, and a description thereof will be omitted.

In this example and Examples 6 and 7 described below, the following inequalities may be satisfied:

$$0.9 \leq \theta 2/\theta 1 \leq 1.1 \tag{8}$$

$$\theta 2 < \theta 3 \tag{9}$$

$$0.2 \leq \theta 3/\theta 4 \leq 1.5 \tag{10}$$

where θ1 is a divergence angle (FWHM) of a light beam emitted from the light source unit 10, θ2 is a divergence angle (FWHM) of the illumination light beam 70, θ3 is a divergence angle of a light beam emitted from the LDA conversion element 44 (45) toward the optical system 50 among the illumination light beam and the image light beam, and θ4 is a ray intake angle (2NA) of the optical system 50.

In the image generator 100 illustrated according to Example 1, the light beams incident on the LDA conversion element 40 have high parallelism as described above, and the optical image on the image generating element 30 and the optical image on the LDA conversion element 40 are approximately equal. Therefore, matching the position of the back focus BF of the optical system 50 and the position of the LDA conversion element 40 can suppress resolution reduction. In other words, in a case where light beams with low parallelism enter the LDA conversion element 40 disposed in the optical path of the optical system 50, an optical image with low resolution is displayed as illustrated in FIG. 13B.

Figure 26:
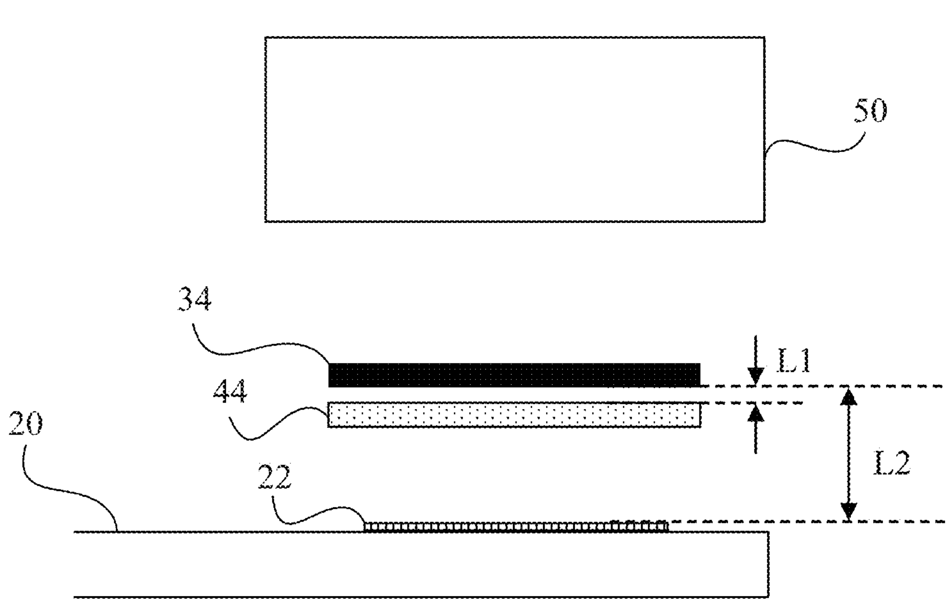
FIG. 26 illustrates the configuration around an image generating element according to Example 5.

Therefore, this example disposes the LDA conversion element 44 between the light guide plate 20 and the image generating element 34. The following inequality is satisfied as illustrated in FIG. 26:

$$0 < L1/L2 < 1 \tag{11}$$

where L1 is a distance between the incident surface of the image generating element 34 and a surface on the image generating element side of the LDA conversion element 44, and L2 is a distance between the incident surface of the image generating element 34 and the exit surface of the light guide plate 20 (exit deflector 22). In a case where the upper limit of inequality (11) is too large, the transmission efficiency of the image generating element 30 lowers. Therefore, inequality (11) may be replaced with inequality (11a) below:

$$0 < L1/L2 \leq 0.5 \tag{11a}$$

Figure 27:
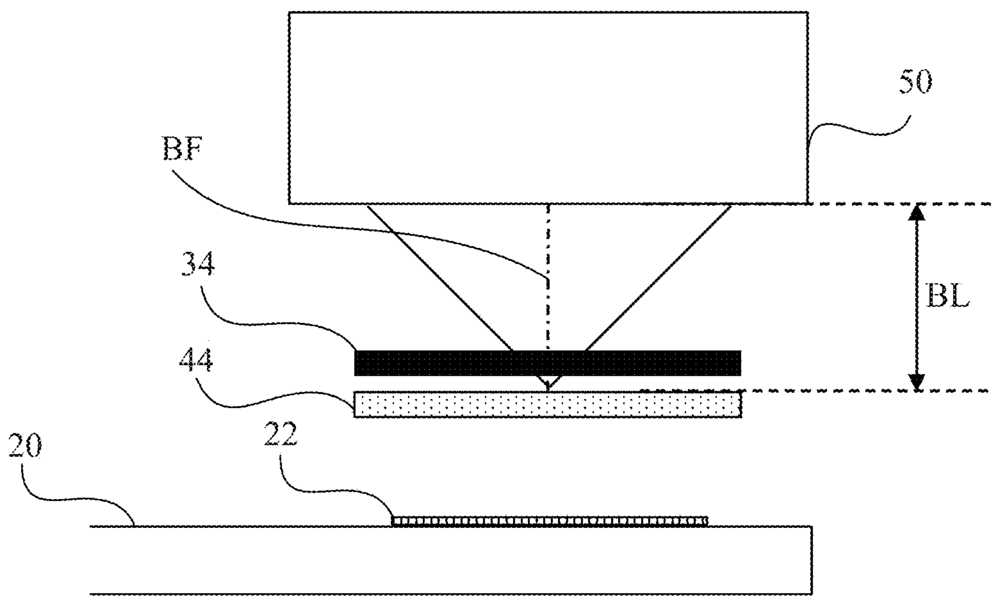
FIG. 27 is another diagram illustrating the configuration around the image generating element according to Example 5.

The following inequality may be satisfied as illustrated in FIG. 27:

$$0.9 \leq BL/BF \leq 1.1 \tag{12}$$

where BF is a back focus of the optical system 50, and BL is a distance on the optical axis between a vertex of an optical surface (lens surface) closest to the image generating element 34 in the optical system 50 and an exit surface of the LDA conversion element 44. Thereby, the resolution drop of the displayed image can be avoided.

Similarly to the LDA conversion element 40 according to Example 1, the LDA conversion element 44 may be a lens diffuser plate having a microlens array or a holographic element with various patterns formed on its surface. The LDA conversion element 44 may have different characteristics on the optical axis (central portion) and off the optical axis (peripheral portion). In the image light beam directed from the LDA conversion element 44 to the optical system 50, a principal ray at the peripheral portion may be tilted relative to the principal ray at the central portion.

Example 6

Figure 28:
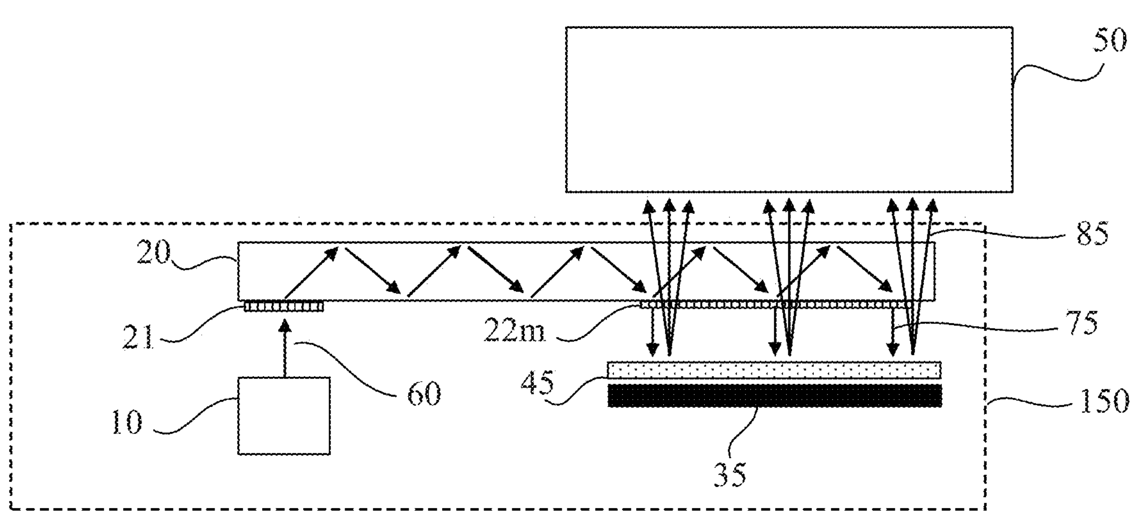
FIG. 28 illustrates the configuration of an image generating apparatus according to Example 6.

FIG. 28 illustrates the configuration of an image display apparatus according to Example 6. The image display apparatus includes an image generator 150 and an optical system 50. This example is different from Example 5 in that the image generating element 35 is a reflection type liquid crystal element, and those elements, which are corresponding elements in Example 5, will be designated by the same reference numerals, and a description thereof will not be described.

Illumination light beams 75 emitted from an exit deflector 22*m* of the light guide plate 20 enter the image generating element 35, are converted into image light beams 85, are reflected, are emitted toward the exit deflector 22*m*, and transmit through the exit deflector 22*m* and the light guide plate 20 toward the optical system 50. The light distribution characteristic of the light beam hardly changes before and after entering and exiting the image generating element 35. Therefore, the image light beam 85 incident on the LDA conversion element 45 disposed between the light guide plate 20 and the image generating element 35 is diffused in accordance with the ray intake angle (2NA) required by the optical system 50.

Figure 29:
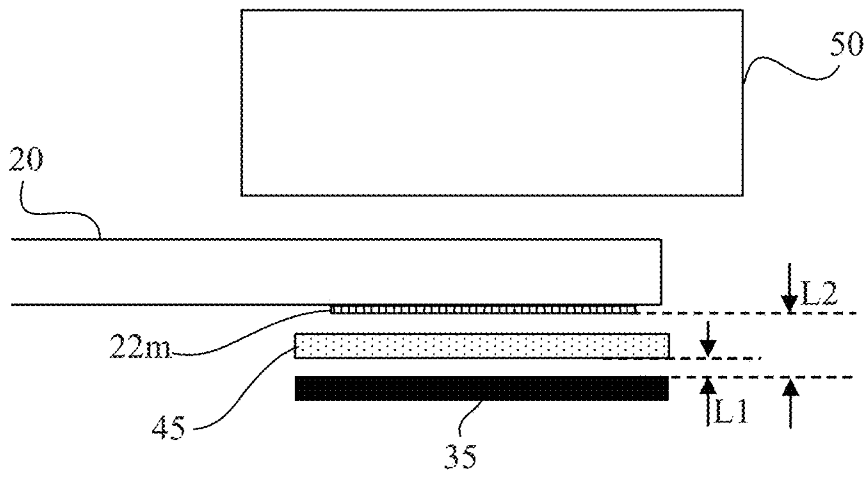
FIG. 29 illustrates the configuration around an image generating element according to Example 6.

In the configuration according to this example, since the LDA conversion element 45 is disposed in the optical path of the optical system 50, the resolution of the displayed image may deteriorate. The resolution reduction has a correlation with a distance between the image generating element 35 and the LDA conversion element 45. As illustrated in FIG. 29, the following inequality may be satisfied:

$$0 < L1/L2 < 1 \tag{13}$$

where L1 is a distance between the incident/exit surface of the image generating element 35 and a surface on the image generating element side of the LDA conversion element 45, and L2 is a distance between the incident/exit surface of the image generating element 35 and the exit surface of the light guide plate 20 (exit deflector 22*m*).

In a case where the upper limit of inequality (13) is too large, the resolution of the displayed image may deteriorate. Therefore, inequality (13) may be replaced with inequality (13a) below:

$$0 < L1/L2 \leq 0.5 \tag{13a}$$

As the LDA conversion element 45 becomes closer to the image generating element 35, the resolution drop decreases. Thus, the surface of the LDA conversion element 45 that has a light distribution angle control function may be close to and face the incident/exit surface of the image generating element 35, for example, so that L1/L2 is 0.2 or less.

Figure 30:
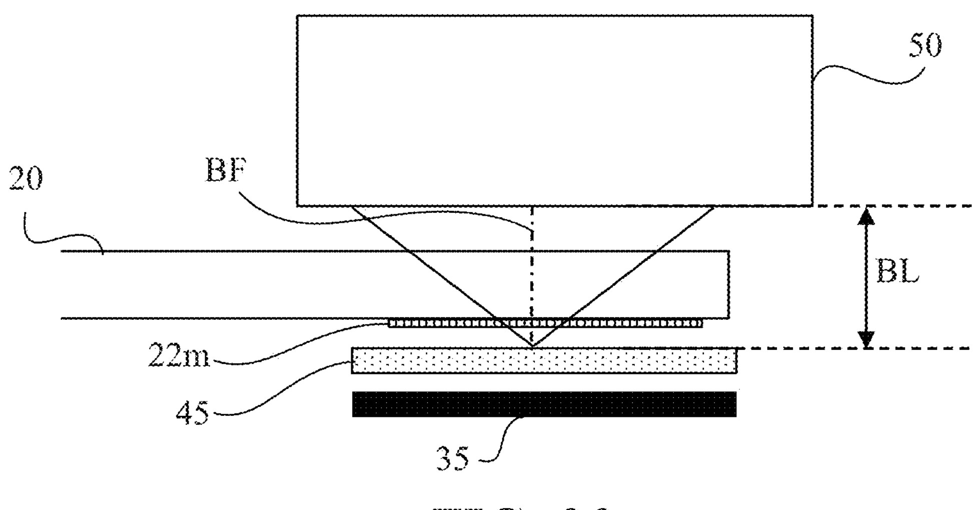
FIG. 30 illustrates the configuration around the image generating element according to Example 6.

As illustrated in FIG. 30, the following inequality may be satisfied to suppress resolution reduction:

$$0.9 \leq BL/BF \leq 1.1 \tag{14}$$

where BF is a back focus of the optical system 50, and BL is a distance on the optical axis between a vertex of an optical surface (lens surface) closest to the image generating element in the optical system 50 and the exit surface of the LDA conversion element 45.

In this example, the exit deflector 22*m* is a DOE having a grating structure finer than the wavelength of incident light, and has optical anisotropy relative to polarized light. More specifically, the exit deflector 22*m* has a characteristic of diffracting S-polarized light and transmitting P-polarized light. Therefore, the light beam 60 as S-polarized light emitted from the light source unit 10 is deflected by the incident deflector 21, propagates through the light guide plate 20, is diffracted by the exit deflector 22*m*, passes through the LDA conversion element 45, and enters the image generating element 35 as the illumination light beams 75. The illumination light beams 75 are modulated into the image light beams 85 and reflected at the image generating element 35. At this time, the phases of the image light beams 85 are modulated by the liquid crystal and the image light beams 85 are emitted as P-polarized light.

The image light beams 85 as P-polarized light are diffused by the LDA conversion element 45, pass through the light guide plate 20 without being diffracted by the exit deflector 22*m*, and enter the optical system 50. The image light beams 85 are diffused by the LDA conversion element 45 in accordance with the ray intake angle (2NA) required by the optical system 50, but in this example, the image light beams 85 are diffused by the LDA conversion element 45 in the round-trip optical path. Where $\sigma$ is the diffusivity (diffusion ratio) required for the LDA conversion element 45, the diffusivity per single plane (each of the outward-trip path and the return-trip path) is $\sigma \times 1/\sqrt{2}$.

The LDA conversion element 45 may use one that diffuses the light beam only in one optical path instead of one that diffuses the light beam in the round-trip optical path.

Example 7

Figure 31:
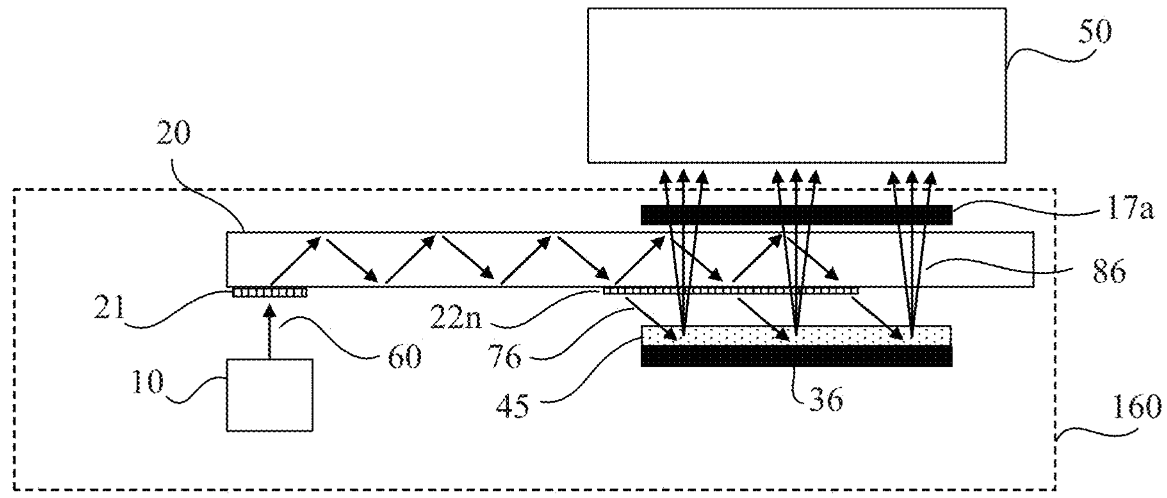
FIG. 31 illustrates the configuration of an image generating apparatus according to Example 7.

FIG. 31 illustrates the configuration of an image display apparatus according to Example 7. The image display apparatus includes an image generator 160 and an optical system 50. This example is different from Example 6 in that an image generating element 36 is a DMD, and those elements, which are corresponding elements in Example 6, will be designated by the same reference numerals, and a description thereof will be omitted.

As described in Example 2, the DMD as the image generating element 36 forms an image by switching the tilt (ON/OFF) of the micromirror for each pixel which the illumination light beams 76 from the light guide plate 20 (exit deflector 22*n*) obliquely enter, and by controlling the deflecting directions of reflected image light beams 86. Since the DMD merely controls the light deflecting (traveling) direction, the deflecting directions of the incident illumination light beams does not need to be unified as in the liquid crystal display element.

Figure 32:
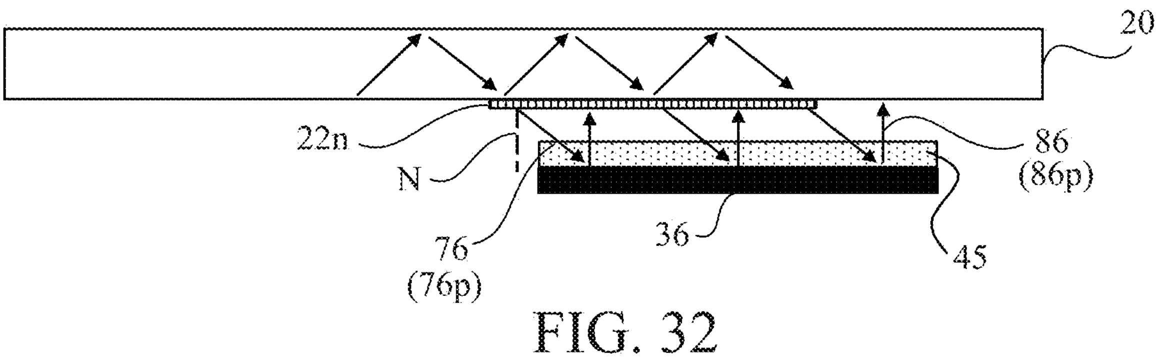
FIG. 32 illustrates the configuration around an image generating element according to Example 7.

As illustrated in FIG. 32, the illumination light beams 76 emitted from the exit deflector 22*n* enter the image generating element 36 via the LDA conversion element 45, the reflecting directions of them are deflected by the image generating element 36, and the illumination light beams 76 are emitted as image light beams 86. The following inequality may be satisfied:

$$20^\circ \leq |\omega 1 - \omega 2| \leq 40^\circ \tag{15}$$

where ω1 is an angle between the normal N to the exit surface of the light guide plate 20 and a principal ray 76*p* of the illumination light beam 76 emitted from the light guide plate 20, and ω2 is an angle between the normal N to the exit surface of the light guide plate 20 and a principal ray 86*p* of the image light beam emitted from the image generating element 36.

Making different the angles of the incident light and the exit light on and from the image generating element so as to satisfy (15) can properly guide the light to the observation side or the projection side. In a case where the value becomes higher than the upper limit, the exit angle of the illumination light beam relative to the exit surface of the light guide plate increases, and light loss increases in the light guide plate. In a case where the value becomes lower than the lower limit, the angle of the image light beam emitted from the image generating element relative to the exit surface of the light guide plate increases, and a light amount guided to the optical system (50) decreases.

An unillustrated non-image light beam reflected by the micromirror in the turning-off state is deflected in a direction different from that of the image light beam 86 reflected by the micromirror in the turning-on state, and is emitted out of the optical path of the image light beam 86. This example processes (absorbs, etc.) the non-image light beam within the image generator 160, and disposes a mask 17*a*, as illustrated in FIG. 31, between the light guide plate 20 and the optical system 50 to block the non-image light beam and prevent the non-image light beam from entering the optical system 50 and from being visually recognized by the observer.

In a case where a DMD is used as the image generating element 36, the illumination light beams 76 and the image light beams 86 are separated by the incident angle on the exit deflector 22*n*, so the exit deflector 22*n* includes a dielectric multilayer film. More specifically, by controlling the transmittance and reflectance according to the incident angle using the incident angle characteristic of the dielectric multilayer film, light incident obliquely on the exit deflector 22*n* is reflected, and light incident vertically or almost vertically transmits it.

Controlling the ratio of the transmittance and reflectance of the light obliquely incident on the exit deflector 22*n* can also secure the uniformity of the illumination light beam 76 that is incident on the entire image generating element 36.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can display an image with excellent resolution even with a simple configuration.

This application claims priority to Japanese Patent Application No. 2023-096488, which was filed on Jun. 12, 2023, and which is hereby incorporated by reference herein in its entirety.

What is claimed is:

1. An image display apparatus comprising:

a light source unit;

an image generating element configured to modulate an incident light beam and to generate an image light beam;

a light guide member configured to propagate a light beam from the light source unit inside the light guide member and to emit as an illumination light beam part of the light beam from each of a plurality of regions on the light guide member toward the image generating element;

an optical system configured to guide the image light beam from the image generating element to an observation side or a projection side; and a light-distribution-angle conversion element disposed between the light guide member and the optical system and configured to convert a light distribution angle of the image light beam, wherein the following inequalities are satisfied:

$$0.9 \leq \theta 2/\theta 1 \leq 1.1$$

$$\theta 2 < \theta 3$$

$$0.2 \leq \theta 3/\theta 4 \leq 1.5$$

where θ1 is a divergence angle of the light beam emitted from the light source unit, θ2 is a divergence angle of the illumination light beam emitted from the light guide member, θ3 is an divergence angle of the image light beam emitted from the light-distribution-angle conversion element, and θ4 is twice as large as a numerical aperture of the optical system.

2. The image display apparatus according to claim 1, wherein the following inequality is satisfied:

$$0.9 \leq BL/BF \leq 1.1$$

where BF is a back focus of the optical system, and BL is a distance between a vertex of an optical surface closest to the image generating element of the optical system and an exit surface of the light-distribution-angle conversion element.

3. The image display apparatus according to claim 1, wherein the image generating element is a transmission type image generating element, and wherein the light-distribution-angle conversion element is disposed between the image generating element and the optical system.

4. The image display apparatus according to claim 1, wherein the image generating element is a reflection type image generating element, and wherein the image light beam from the image generating element transmits through the light guide member and enters the optical system.

5. The image display apparatus according to claim 4, wherein the following inequality is satisfied:

$$L1/L2 < 1$$

where L1 is a distance between an exit surface of the image generating element and an exit surface of the light guide member, and L2 is a distance between the exit surface of the image generating element and an incident surface of the light-distribution-angle conversion element.

6. The image display apparatus according to claim 5, wherein the following inequality is satisfied:

$$20^\circ \leq |\omega 1 - \omega 2| \leq 40^\circ$$

where ω1 is an angle between a normal to an exit surface of the light guide member and a principal ray of the illumination light beam emitted from the light guide member, and ω2 is an angle between the normal and a principal ray of the image light beam emitted from the image generating element.

7. An image display apparatus comprising:

a light source unit;

an image generating element configured to modulate an incident light beam and to generate an image light beam;

a light guide member configured to propagate a light beam from the light source unit inside the light guide member and to emit as an illumination light beam part of the light beam from each of a plurality of regions on the light guide member toward the image generating element;

an optical system configured to guide the image light beam from the image generating element to an observation side or a projection side; and a light-distribution-angle conversion element disposed between the light guide member and the image generating element and configured to convert a light distribution angle of at least one of the illumination light beam and the image light beam, wherein the following inequalities are satisfied:

$$0.9 \leq \theta 2/\theta 1 \leq 1.1$$

$$\theta 2 < \theta 3$$

$$0.2 \leq \theta 3/\theta 4 \leq 1.5$$

where θ1 is a divergence angle of the light beam emitted from the light source unit, θ2 is a divergence angle of the illumination light beam emitted from the light guide member, θ3 is an divergence angle of the image light beam emitted from the light-distribution-angle conversion element, and θ4 is twice as large as a numerical aperture of the optical system.

8. The image display apparatus according to claim 7, wherein the following inequality is satisfied:

$$0 < L1/L2 < 1$$

where L1 is a distance between an exit surface of the image generating element and an exit surface of the light guide member, and L2 is a distance between the exit surface of the image generating element and an incident surface of the light-distribution-angle conversion element.

9. The image display apparatus according to claim 7, where the following inequality is satisfied:

$$0.9 \leq BL/BF \leq 1.1$$

where BF is a back focus of the optical system, and BL is a distance between a vertex of an optical surface closest to the image generating element of the optical system and an exit surface of the light-distribution-angle conversion element.

10. The image display apparatus according to claim 7, wherein the image generating element is a transmission type image generating element, and wherein the light-distribution-angle conversion element is disposed between the light guide member and the optical system.

11. The image display apparatus according to claim 7, wherein the image generating element is a reflection type image generating element, and wherein the image light beam from the image generating element transmits through the light guide member via the light-distribution-angle conversion element and enters the optical system.

12. The image display apparatus according to claim 11, wherein a surface of the light-distribution-angle conversion element having a light distribution angle control function faces the image generating element.

13. The image display apparatus according to claim 11, wherein the following inequality is satisfied:

$$20° \leq |\omega 1 - \omega 2| \leq 40°$$

where ω1 is an angle between a normal to an exit surface of the light guide member and a principal ray of the illumination light beam emitted from the light guide member, and ω2 is an angle between the normal and a principal ray of the image light beam emitted from the image generating element.

14. An image display system comprising:

an image display apparatus; and an eyepiece optical system configured to guide the image light beam from the image display apparatus to an eye of an observer, wherein the image display apparatus includes:

a light source unit;

an image generating element configured to modulate an incident light beam and to generate an image light beam;

a light guide member configured to propagate a light beam from the light source unit inside the light guide member and to emit as an illumination light beam part of the light beam from each of a plurality of regions on the light guide member toward the image generating element;

an optical system configured to guide the image light beam from the image generating element to an observation side or a projection side; and a light-distribution-angle conversion element disposed between the light guide member and the optical system and configured to convert a light distribution angle of the image light beam, wherein the following inequalities are satisfied:

$$0.9 \leq \theta 2/\theta 1 \leq 1.1$$

$$\theta 2 < \theta 3$$

$$0.2 \leq \theta 3/\theta 4 \leq 1.5$$

where θ1 is a divergence angle of the light beam emitted from the light source unit, θ2 is a divergence angle of the illumination light beam emitted from the light guide member, θ3 is an divergence angle of the image light beam emitted from the light-distribution-angle conversion element, and θ4 is twice as large as a numerical aperture of the optical system.

15. An image display system comprising:

an image display apparatus; and an eyepiece optical system configured to guide the image light beam from the image display apparatus to an eye of an observer, wherein the image display apparatus includes:

a light source unit;

an image generating element configured to modulate an incident light beam and to generate an image light beam;

a light guide member configured to propagate a light beam from the light source unit inside the light guide member and to emit as an illumination light beam part of the light beam from each of a plurality of regions on the light guide member toward the image generating element;

an optical system configured to guide the image light beam from the image generating element to an observation side or a projection side; and a light-distribution-angle conversion element disposed between the light guide member and the image generating element and configured to convert a light distribution angle of at least one of the illumination light beam and the image light beam, wherein the following inequalities are satisfied:

$$0.9 \leq \theta 2/\theta 1 \leq 1.1$$

$$\theta 2 < \theta 3$$

$$0.2 \leq \theta 3/\theta 4 \leq 1.5$$

where θ1 is a divergence angle of the light beam emitted from the light source unit, θ2 is a divergence angle of the illumination light beam emitted from the light guide member, θ3 is an divergence angle of the image light beam emitted from the light-distribution-angle conversion element, and θ4 is twice as large as a numerical aperture of the optical system.

* * * * *